Jan. 13, 1925.

A. S. BERTELS 1,522,855

ELECTRICAL TESTING SYSTEM

Filed Oct. 23, 1922  7 Sheets-Sheet 1

Inventor:
Arnold S. Bertels
by W. E. Beatty, Atty.

Jan. 13, 1925. 1,522,855
A. S. BERTELS
ELECTRICAL TESTING SYSTEM
Filed Oct. 23, 1922   7 Sheets-Sheet 5

Inventor:
Arnold S. Bertels
by W. E. Beatty, Atty

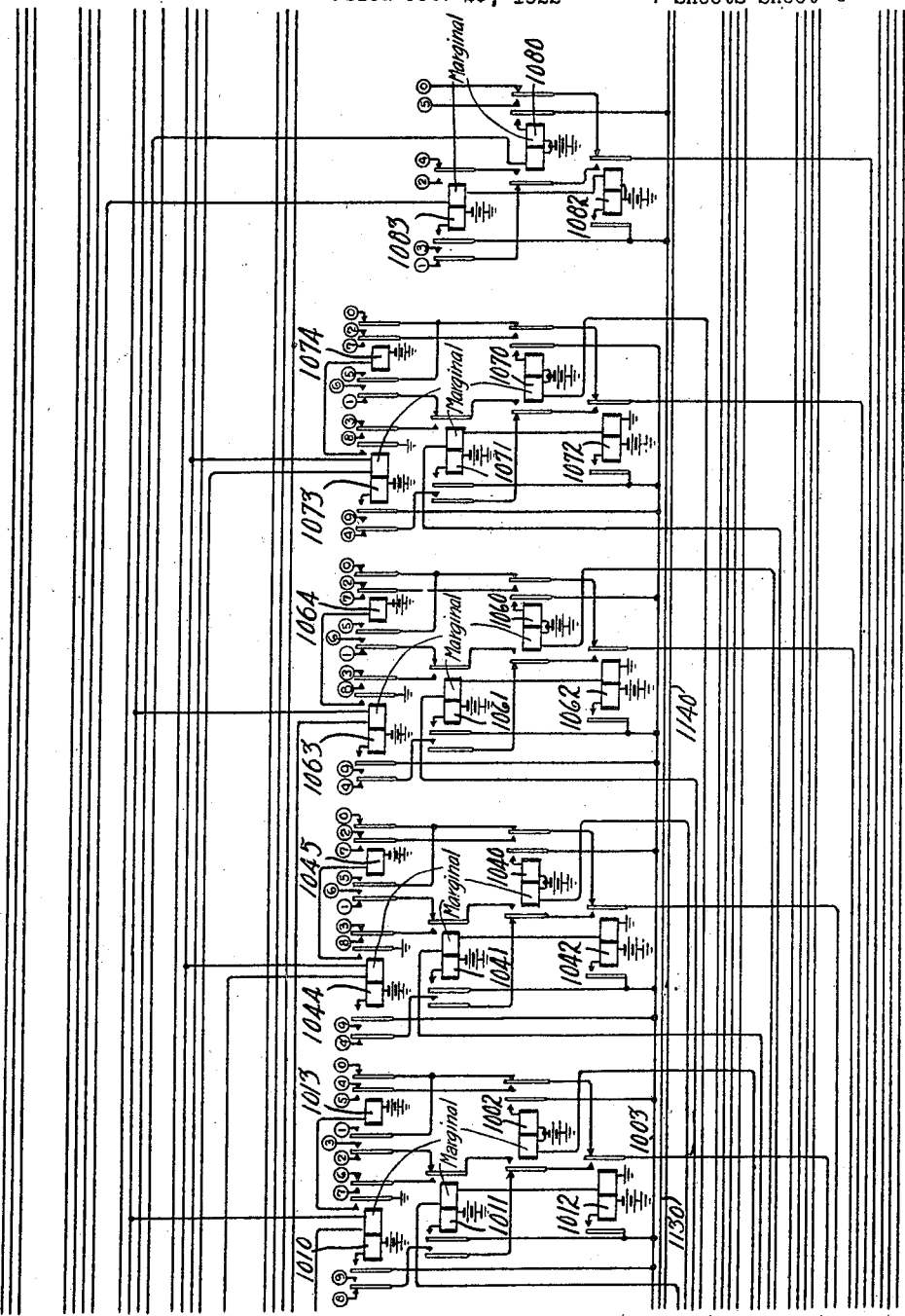

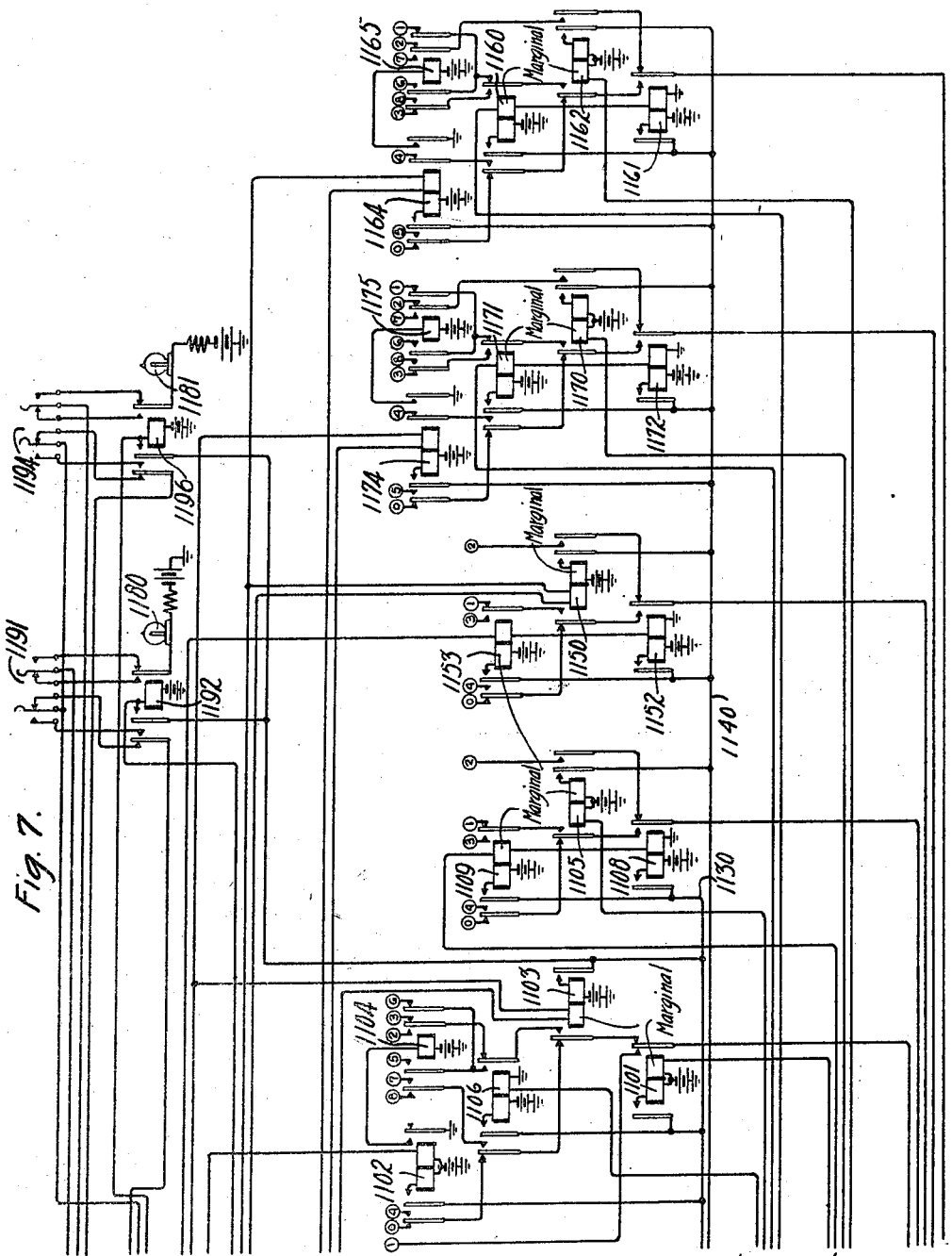

Patented Jan. 13, 1925.

1,522,855

UNITED STATES PATENT OFFICE.

ARNOLD S. BERTELS, OF HIGHWOOD, NEW JERSEY, ASSIGNOR TO WESTERN ELECTRIC COMPANY, INCORPORATED, OF NEW YORK, N. Y., A CORPORATION OF NEW YORK.

ELECTRICAL TESTING SYSTEM.

Application filed October 23, 1922. Serial No. 596,203.

*To all whom it may concern:*

Be it known that I, ARNOLD S. BERTELS, a citizen of the United States, residing at Highwood, in the county of Bergen and State of New Jersey, have invented new and useful Improvements in Electrical Testing Systems, of which the following is a full, clear, concise, and exact description.

This invention relates to electrical testing systems and more particularly to a device for testing circuits and apparatus which control automatic switching apparatus employed in central offices for the extension of connections.

In large central office districts, tandem switching is resorted to and register senders are utilized to exercise the necessary control in the establishment of connections which involve offices of either a full mechanical or a semi-mechanical nature. In systems of this nature, described in the application of Franklin A. Stearn, Serial No. 474,702, filed June 3, 1921, the register senders comprise office code and numerical registers which are set under the control of an operator who has, at her position, a keyboard comprising coordinate office keys and numerical keys. The office keys which control the setting of the office code registers, comprise two sets of keys, the total number of which is less than the total number of offices served. Translator switches and circuits controlled thereby are interposed between the operator's position and the office code registers of the sender.

In the system above mentioned, the operator, in order to call a desired subscriber, actuates one key of each set of the coordinate keys which causes the translator switch to function to set translator registers associated therewith, after which the operator depresses the numerical keys. At a certain stage of the operation, impulses are transmitted to the register senders to record the designation therein corresponding to the depressed office and numerical keys.

An object of the present invention is to provide an arrangement for making routine and special tests on the apparatus and circuits employed in connection with the operator's keyboard for controlling the extension of connections in semi-mechanical systems.

More specifically, an object of the invention is to provide a device for testing the numerical and translator control circuits of the type described in the above mentioned Stearn application.

A feature of the invention is the means for testing each individual step of the device to be tested.

Another feature of the invention is the means for repeatedly testing the device to be tested.

Such other and further features as are contemplated by the present invention will be understood from a consideration of the following description and the appended claims.

Referring to the drawings, Figs. 1 to 7 inclusive, when arranged in the order illustrated by the diagram in Fig. 8, disclose in detail the circuits and apparatus embodying the principles of the present invention.

Figure 3:
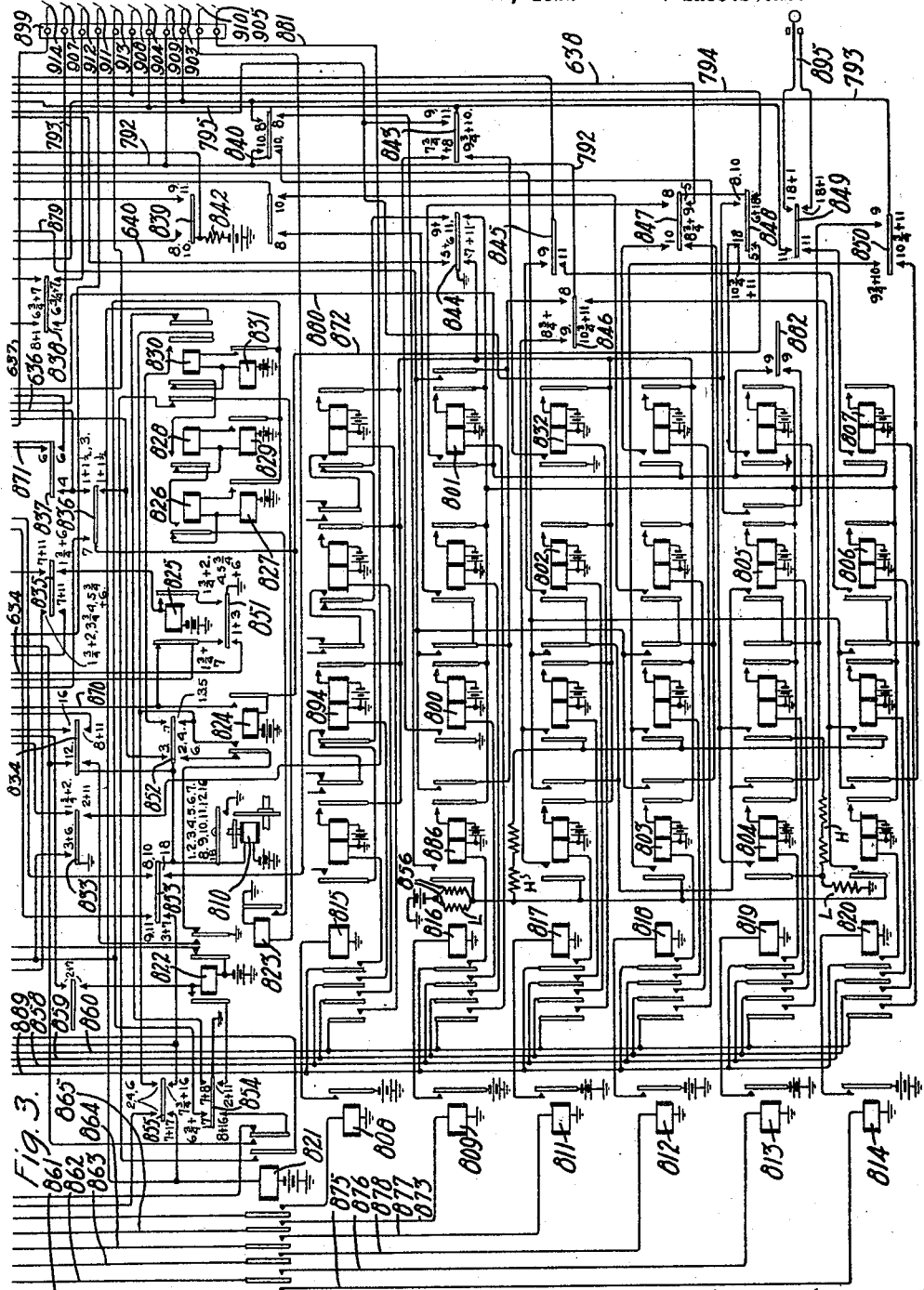

Fig. 3 illustrates sets of class and office registers, which are adjusted by impulses from the impulse machine in accordance with the setting taken by the translator switch. This figure further shows a controlling sequence switch which cooperates with a sequence switch shown in Fig. 4 in transferring the class and office records from the translator registers in Fig. 3 to the corresponding registers of the testing device in Fig. 7. At the upper right hand corner of Fig. 3 a set of contacts is shown to which connections extending from the numerical control circuit and the translator control circuit are extended.

Figs. 4 to 7 inclusive, taken together show the circuits of the testing device forming the subject matter of this invention.

Figure 4:
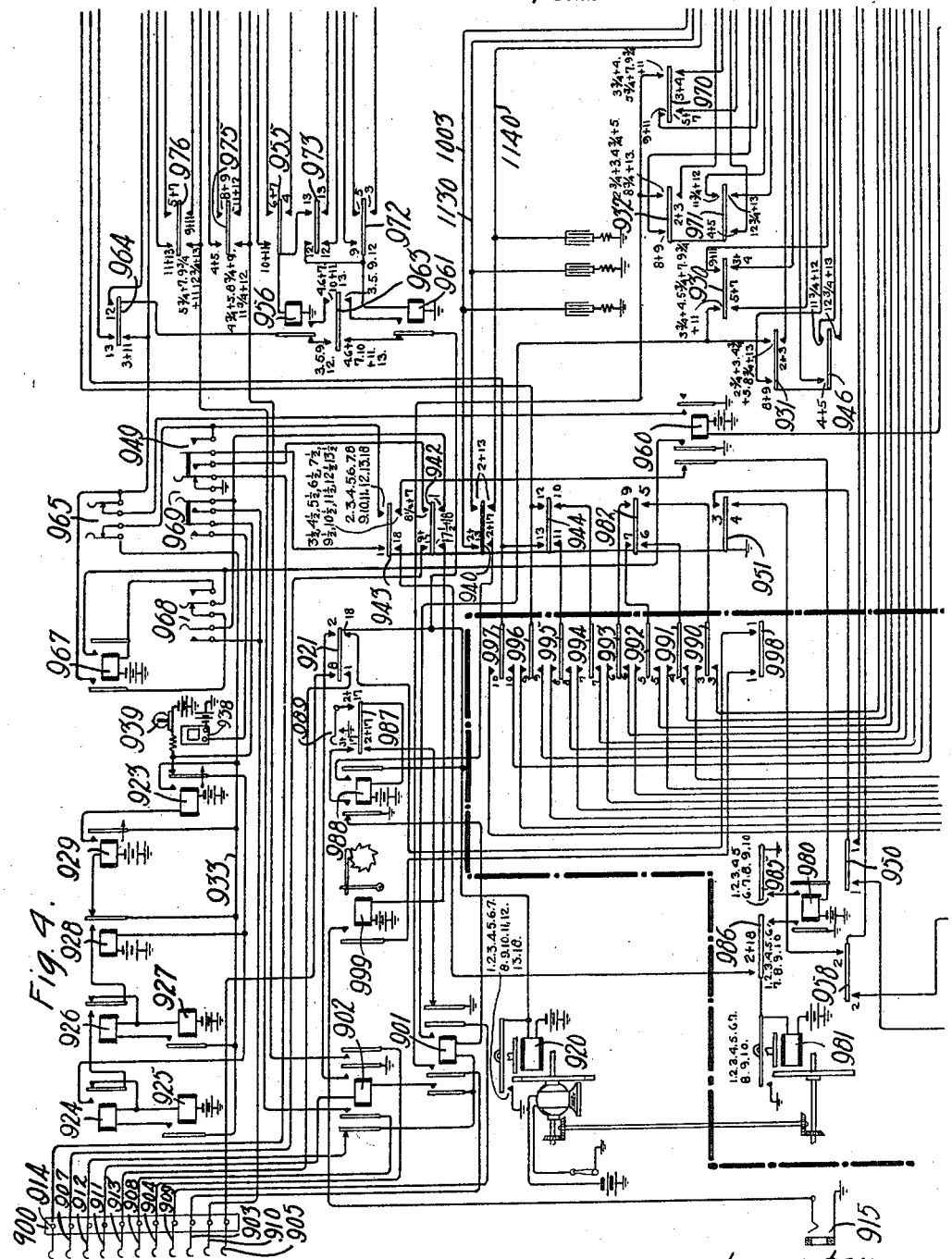

Fig. 4 shows a register control sequence switch which serves to direct the recording impulses to the registers of the testing device in succession during the registration of a designation. A second sequence switch for assisting in the operation of the testing device is also shown. At the upper left hand corner of Fig. 4, contacts are shown which are adapted for connection to the contacts shown at the upper right hand corner of Fig. 3. Various keys shown are arranged for making different tests.

Figure 5:
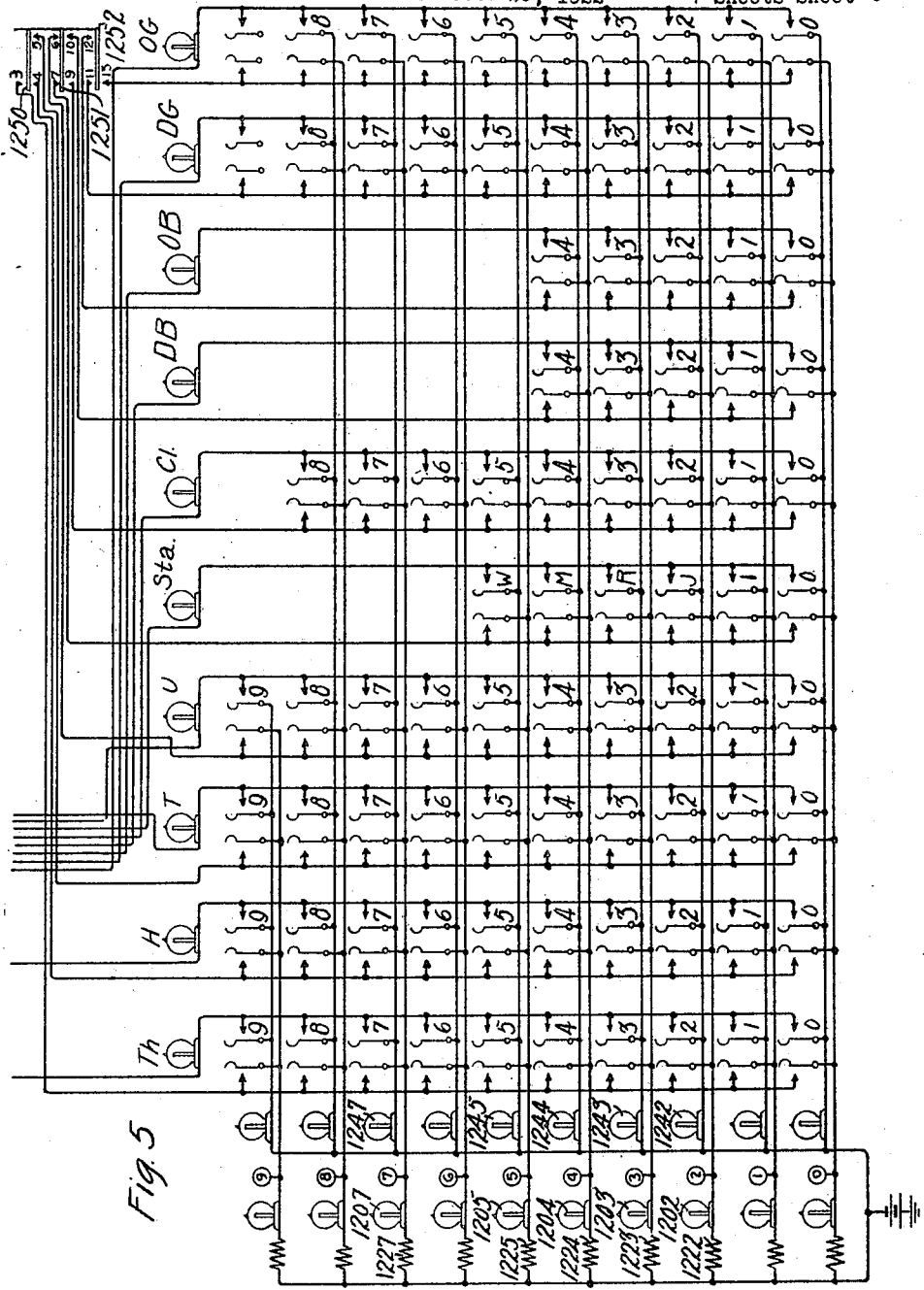

Fig. 5 includes the testing operator's keyboard consisting of office, numerical and stations keys, a set of progress lamps, a set of matching lamps and a set of register lamps.

Fig. 6 shows the numerical and stations registers.

Fig. 7 shows the class and office registers and a pair of keys for conducting certain tests.

*Description of apparatus.*

The sequence switches 710, 810, 920 and 981 are all similar to the one described in detail in the patent to Reynolds and Baldwin, No. 1,127,808, issued February 9, 1915. Referring to Fig. 4, it should be noted that all sequence switch contacts there shown are part of the sequence switch 920, with the exception of the contacts included in the space set off by broken lines in the lower left hand corner of the figure. The contacts shown in this space are controlled by the sequence switch 981. The sequence switch contacts shown in the upper right hand corner of Fig. 5, are part of the sequence switch 920.

In systems of the type disclosed in the above mentioned Stearn application, the operator at the tandem switching office must be able to record on the register sender a wide range of called designations in order that connections incoming to the operator may be routed to any one of the large number of terminating offices. To this end her position is equipped with a keyboard which may be considered as comprising two distinct parts. The first part of the keyboard consists of two rows of office coordinate keys, the horizontal row 600 and the vertical row 610. As shown, there are twenty keys in each of these two rows. By coordinating any key in the horizontal row with any one of the twenty different keys in the vertical row, that is, by depressing one key in one row and one key in the other row, the possibility of four hundred different combinations is obtained. This means, by assigning to each office in the area served through the tandem switching center a code designation of two digits, which may be either ordinals or letters, a total of four hundred different selections would be possible by the type of keyboard illustrated.

In the present disclosure, however, the capacity of the system is assumed as two hundred offices and only the first ten keys of the horizontal row 600 are employed in connection with the twenty keys in the vertical row 610. The horizontal keys are divided into four groups, 601, 602, 603 and 604 of five keys each. The first two groups of five, 601 and 602, are effective groups as will be seen hereafter for accomplishing the two hundred different office selections. The act of actuating any horizontal key in either of the two groups 601 and 602 together with a vertical key in the row 610 is to cause the operation of the translator switch 700 to select any one of its 200 different sets of terminals. The translator switch 700 is provided with five sets of brushes, only one of which is shown, mounted on the brush shaft 734. Each set of brushes has access to a section of forty sets of terminals in the bank, the forty sets of terminals of each section being divided into two groups of twenty terminals each. The five different keys in the groups 601 and 602 correspond to the five sets of brushes on the translator switch, that is to say, the first key in group 601 or the first key in group 602 causes the selection and tripping of the first set of brushes, the second keys in the groups 601 and 602, the selection and tripping of the second set of brushes, etc. Inasmuch as each set of brushes has access to forty sets of terminals and there are only twenty vertical keys in the row 610, it is necessary to make the selection of a group of twenty terminals dependent on the horizontal keys. This is done by so arranging the circuits that when any one of the five keys in the first horizontal group 601 is actuated, the corresponding one of the five different sets of brushes of the translator is tripped, and furthermore is caused to search in the first group of twenty terminals. On the other hand, if a key is depressed in the second group of horizontal keys 602, the proper set of brushes of the translator is tripped and caused to automatically pass over the first group of twenty terminals in the section and to search for a set of terminals in the second group of twenty. The final selection of a set of terminals in either group of twenty terminals is determined by the particular one of the twenty vertical keys operated in conjunction with a horizontal key.

The two hundred different sets of terminals in the bank of the translator switch are variously and arbitrarily wired to the brushes 771 to 777 inclusive of the impulse machine. The impulse machine consists of a circular drum provided with a circumferential row of contacts, which cooperate with the brushes. This drum is constantly driven by any suitable source of power. As shown in the drawing, the circular drum is developed to show the relative positions of the contacts, and the brushes may be considered as movable in the direction of the arrow. Battery potential is connected to all of the contacts shown on the developed surface of the circular drum. While only two sets of terminals in the translator bank are shown as wired to the brushes of the impulse machine, and only the proper contacts upon the circular drum are illustrated to produce the desired record for the calls which will be considered in this discussion, it will be understood, of course, that as many brushes and as many contacts will be used as are necessary to enable a total of two hundred different combinations of connections between the terminal bank of the translator switch and the impulse machine.

After the translator switch has been positioned on the proper set of terminals, thereby associating the row of contacts of the impulse machine corresponding to the combination of horizontal and vertical office keys depressed, with the register relays of Fig. 3, circuits are prepared for recording the office record on the translator register relays shown in Fig. 3. To accomplish this, impulses are sent from the impulse machine during its rotation through the terminal bank and brushes of the translator switch in such codes as to cause the operation of the class and office translator register relays in Fig. 3 in combinations for setting up the record which corresponds to the office keys depressed and which later becomes effective in controlling the selective movements of the district and office switches in the tandem switching office to select a trunk to the desired outlying office or, in the present case, will later become effective in controlling the office lamps of the testing operator's keyboard.

Figure 1:
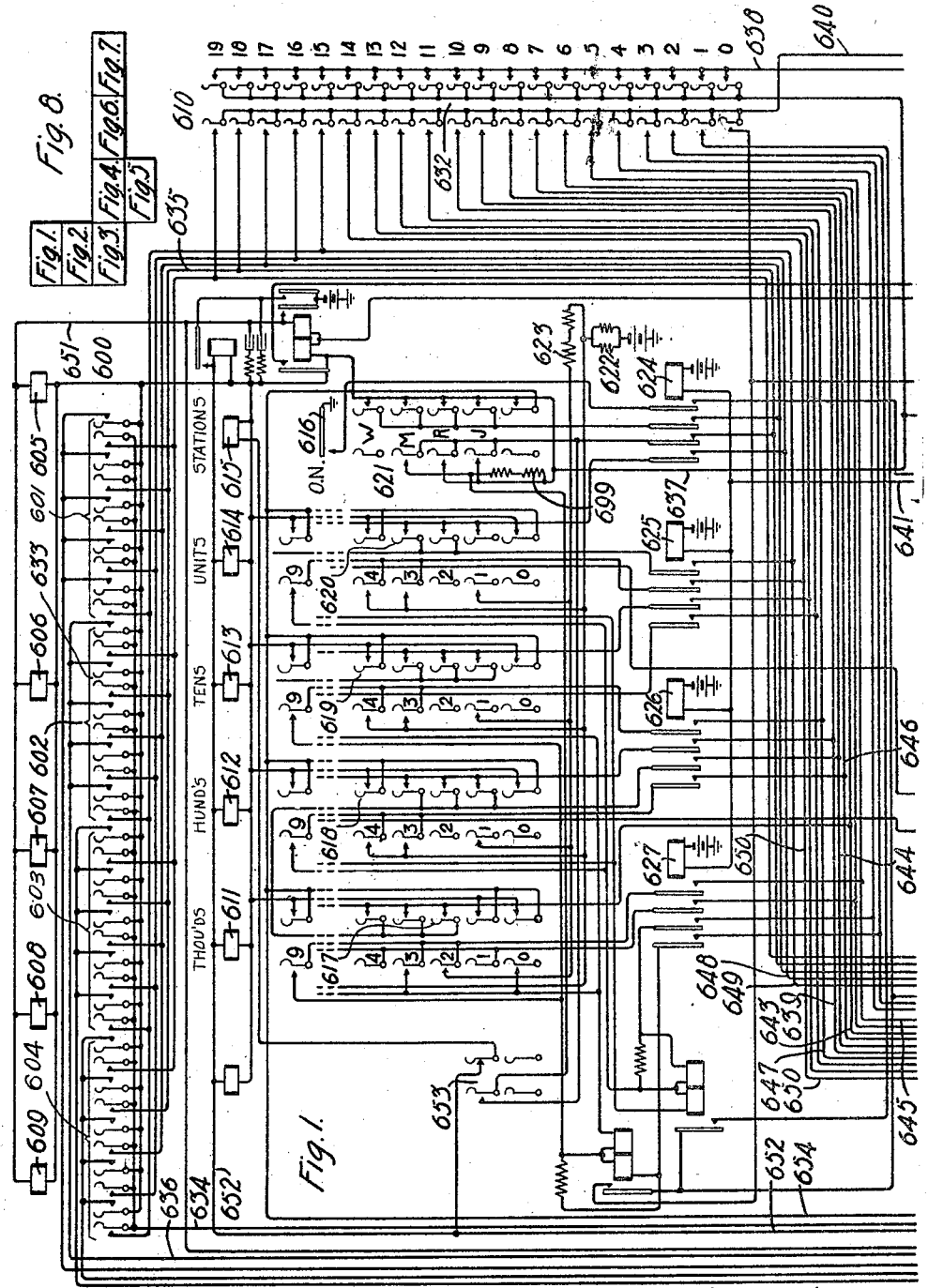
Fig. 1 illustrates a keyboard consisting of office, numerical and stations keys located at an operator's position.
Figure 2:
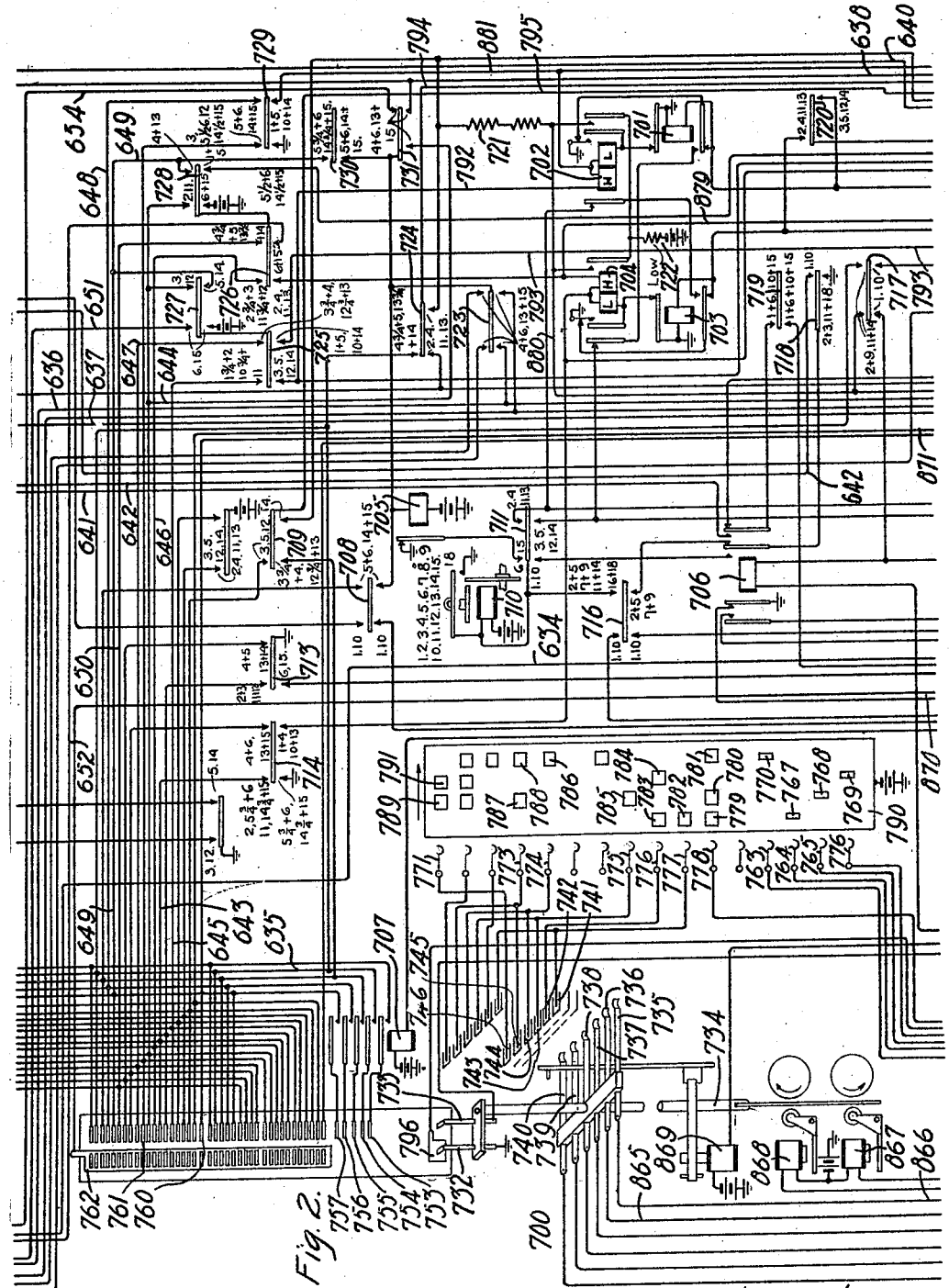
Fig. 2 shows a translator switch, the setting of which is governed by the office keys, and also an impulse machine which is connected in variable combinations to the terminals of the translator switch. This figure also shows a control sequence switch for assisting in the transfer of the numerical record from the operator's keyboard to the registers of the testing device.

The second part of the operator's keyboard, shown in Fig. 1, consists of four rows of numerical keys, thousands, hundreds, tens and units, and a row of stations keys. The numerical keys, when depressed in accordance with the number of the called line, determine the nature of impulses sent by the controlling sequence switch 710 to the numerical registers of the testing device, shown in Fig. 6. As will be seen hereafter, the numerical record is transferred from the regular operator's keyboard immediately that the translator switch has been operated and the office record set up on the translator register relays. The office record, having thus been established on the translator register relays, the numerical record is transferred to the registers of the testing device, following which operation, the office designation is transferred from the translator registers to the office registers of the testing device. After this has taken place, the translator switch, the operator's keyboard and other associated mechanism are restored to their normal position.

In Fig. 4, a start key 968 is shown, which is supplied for moving the test sequence switch 920 from position 18 to position 1 in order to start a test. This key is also used in conjunction with the step by step key 965 for advancing the test sequence switch 920 from any position. A disconnect key 989 is shown, which is used for returning the sequence switch 920 to normal from any position during the test. An exercise key 969 is shown, which is used for testing a call repeatedly without it being necessary to record the call each time on the numerical and office keys of the regular operator's keyboard. In case the switch stops in any position during an exercise test, a buzzer operates and the trouble lamp lights.

In Fig. 5, the testing operator's keyboard is shown. This keyboard comprises a thousands, a hundreds, a tens, a units, a stations, a class, a district brush, an office brush, a district group and an office group set of keys, a set of register lamps, a set of matching lamps and a set of progress lamps. The matching lamps light during the sending of each series of impulses in accordance with the number set up by the testing operator.

In Figs. 6 and 7 the numerical, stations, class and office registers are shown, each register consisting of a plurality of relays. The thousands register comprises the relays 1010, 1011, 1012, 1013 and 1002; the hundreds register comprises the relays 1040, 1041, 1042, 1044 and 1045; the tens register comprises relays 1060, 1061, 1062, 1063 and 1064; the units register comprises the relays 1070, 1071, 1072, 1073 and 1074, and the stations register comprises the relays 1080, 1082 and 1083. The class register comprises the relays 1101, 1102, 1103, 1104 and 1106. The office routing registers comprise four groups of relays; the district brush register consisting of relays 1105, 1108 and 1109; the office brush register comprising the relays 1150, 1152 and 1153; the district group register comprising relays 1170, 1171, 1172, 1174 and 1175; and the office group register consisting of relays 1160, 1161, 1162, 1164 and 1165. Some of these register relays are wound so as to be sensitive to weak currents and others are made marginal and will only respond to strong currents. By use of these two operating conditions, resistances may be inserted or omitted from the impulse circuits to permit the operation of the register relays in any desired combination. The contacts of certain ones of the relays are shown as terminating in small circles which include the ordinals from 0 to 9. This convention indicates that the contacts of the relays are wired directly to the correspondingly designated circuits in Fig. 5. The omission of the conductors between the registers of the counting relays has been made to avoid unnecessary confusion in the drawing.

General description of operation.

The apparatus of the testing device may be mounted in any suitable carriage so that it may be moved from one operator's position to another. Flexible cords may be provided for connecting the sets of contacts 900 and 915 of the testing device with the contacts 899 and 895 at the operator's position under test. The testing operator first records a number of the testing device and then the corresponding number on the regular operator's keyboard. The matching lamps light during the sending of each series of impulses in accordance with the number set up by the testing operator. The register lamps light at proper times to indicate the number of impulses which have actually been received at the testing device in response to the setting of the regular operator's keyboard. The progress lamps indicate the stage of the testing operation and inform the testing operator which series of impulses is being sent at any time.

Detailed description of operation.

In giving a detailed description of the operation of the testing device, it will be assumed that the testing operator desires to test the apparatus associated with the regular operator's keyboard in the positions which it would assume if the regular operator's keyboard were operated to extend a connection to a station M of a party line 2443 of a full mechanical office and that the testing operator has inserted the plugs 900 and 895 into the jacks 899 and 915 respectively. The testing operator may be supplied with a chart from which it will appear what keys of the testing operator's keyboard correspond to the office keys of the regular operator's keyboard. Assuming that the mechanical office in which the number 2443 is located is represented by the seventh key 633 in the horizontal row 600 and the No. 10 key 632 in the vertical row 610, the testing operator will refer to the chart and will find that the office keys of the test keyboard corresponding thereto are the No. 2 class key, the No. 2 district brush key, the No. 2 office brush key, the No. 4 district group key and the No. 7 office group key. The testing operator will therefore record this designation on the office keys of the test keyboard and in addition thereto, the numerical designation 2443 and the station designation M, after which the testing operator will record the designation on the regular operator's keyboard corresponding thereto. In recording this designation on the regular operator's keyboard, the stations key is the last key to be depressed. If the sequence switch 810 of the translator control circuit is in position 1, the translator circuit will start to operate as soon as one of the keys in the horizontal row of coordinate keys has been operated. If the sequence switch 810 is in position 18 however, it is necessary that the start key 968 of the test set be operated in order to advance the said sequence switch to position 1. Actuation of key 968 completes a circuit extending from ground, through the lower right-hand contact of sequence switch spring 942 (1), left-hand contacts of start key 968, contacts 910, lower right-hand contact of sequence switch spring 853 (18) and winding of sequence switch magnet 810 to battery, driving sequence switch 810 from position 18 into position 1.

With the sequence switch 810 in position 1 and with the coordinate keys 632 and 633 of the regular operator's keyboard actuated, the translator is operated. Since the actuated coordinate horizontal key 633 is located in the second group of five keys 602, the translator switch 700 will be caused to pass over the entire first group of twenty terminals and to search for a set of terminals in the second group of twenty corresponding to the vertical key 632. Moreover, since the key 633 is the second key in the group of 5, the second of the five different sets of brushes on the translator will be chosen and tripped into engagement with the corresponding section of the terminal bank. With the sequence switch 810 in position 1 and with the horizontal key 633 actuated, a circuit is established from ground, through the innermost right hand contacts of exercise key 969, contacts 914, conductor 637, right-hand contacts of key 633, conductor 636, upper right-hand contact of sequence switch spring 836 (1+1½), winding of relay 824 to battery. Relay 824 becomes energized and closes a circuit from battery, through sequence switch magnet 810, lower right-hand contact of sequence switch spring 852, front contact and left-hand armature of relay 824, back contact and outer right-hand armature of relay 822 to ground, driving sequence switch 810 out of position 1 and into position 2. As the sequence switch 810 passes into position 1¾, a holding circuit is closed as follows for relay 824, battery through the winding and right-hand armature, and contact of said relay, contact and left-hand armature of relay 825, upper left-hand contact of sequence switch spring 851 (1¾+7) to ground. With the sequence switch 810 in position 2, a circuit is closed for advancing the sequence switch 920 of the testing device from position 1 to 2, said circuit being as follows: battery, through the winding of magnet 920, lower left-hand contact of sequence switch spring 921 (1), contacts 913, back contact and outer right-hand armature of relay 706, upper and lower contacts of sequence switch spring 719 (1+6), and upper left-hand contacts of sequence switch spring 851 (1¾+7) to ground. Another circuit is closed from battery through relay 707 to ground at the upper right contact of sequence switch spring 833 (1¾+2).

With the sequence switch 810 in position 2, the translator switch 700 is set into operation to select the proper set of brushes as determined by the horizontal key. The circuit for the up-drive magnet 868 which causes the upward movement of the translator brush shaft 734 may be traced from battery through the winding of said magnet, upper contacts of sequence switch spring 855 (2), front contact and left-hand armature of relay 824 to ground through the back contact and outer right-hand armature of relay 822. The brush shaft of the translator switch is moved upwardly and as it approaches its successive brush tripping positions, the commutator brush 733 encounters the corresponding segments 753, 754, 755, 756 and 757. In the present instance, the second horizontal key in a group of five, being the one depressed, the following circuit is completed when the brush 733 encounters the second contact 754: battery through the winding of relay 825, lower right-hand contact of sequence switch spring 835 (1¾+6), upper left-hand contact of said spring (1¾+2), brush 733, contact 754, next to the inner armature and contact of relay 707, conductor 635, left-hand contacts of key 633, conductor 634, lower left-hand contact of sequence switch spring 851 (1+3) to ground. Relay 825 attracts its armatures, locking to ground at spring 851 (1¾+2) and opening the locking circuit of relay 824. Relay 824 deenergizes and opens the circuit of the up-drive magnet 868 causing the translator switch to come to rest in position for tripping the proper set of brushes. Relay 824 now completes a circuit from battery through the winding of sequence switch magnet 810, lower left-hand contact of sequence switch spring 852 (2), back contact and left-hand armature of relay 824, back contact and outer right-hand armature of relay 822 to ground, driving sequence switch 810 out of position 2 and into position 3. In position 3 of the sequence switch the locking circuit of relay 825 is opened and a circuit is closed from battery through the winding of trip magnet 869, upper left-hand contact of sequence switch spring 833 (3+6) to ground. Magnet 869 becomes energized and rotates the trip spindle preparatory to tripping the selected set of brushes on the next upward movement of the brush shaft.

The relay 824 is again energized in a circuit from battery through its winding, upper right-hand contact of sequence switch spring 836 (3), conductor 636, right-hand contacts of key 633 to ground on conductor 637 over the path previously traced. Relay 824 locks in the circuit previously traced through the contact and left-hand armature of relay 825. Relay 824 also closes a circuit from battery through the winding of sequence switch magnet 810, lower right-hand contact of spring 852 (3), front contact and left-hand armature of relay 824, to ground at the outer right-hand armature of relay 822, driving sequence switch 810 out of position 3 and into position 4. In this position the above traced circuit is again closed for the up-drive power magnet 868, through the upper contacts of sequence switch spring 855 and the brush shaft 734 of the translator shaft is moved upwardly. The tripped set of brushes 735 to 740 inclusive, continue to move over the first group of twenty terminals. When the commutator brush 733 encounters the first contact 760 belonging to the second group of twenty terminals, a circuit is closed from battery through the winding of relay 825, lower right-hand contact of spring 835 (1¾+6), upper left-hand contact of said spring (3¾+4), brush 733, contact 760, conductor 871, lower left-hand contact of sequence switch spring 837 (4), conductor 636, thence through the right-hand contacts of the horizontal key 633 to ground. Relay 825 attracts its armatures opening the circuit of relay 824 which becomes deenergized and opens the circuit of power magnet 868. Relay 824 in deenergizing, completes a circuit from battery, through the winding of sequence switch magnet 810, lower left-hand contact of sequence switch spring 852 (4), back contact of left-hand armature of relay 824, back contact and outer right-hand armature of relay 822 to ground, driving said sequence switch into position 5.

With the vertical key 632 actuated, a circuit is closed from battery through the winding of relay 824, conductor 872, lower left-hand contact of spring 848 (5), lower right-hand contact of spring 847 (5), conductor 638, right-hand contacts of key 632 to ground on conductor 637 over the path previously traced. Relay 824 becomes energized and locks in the previously described circuit through the contact and left-hand armature of relay 825, this latter relay having deenergized when sequence switch 810 moved from position 4 into position 5. Relay 824 completes a circuit from battery through the winding of sequence switch magnet 810, lower right-hand contact of sequence switch spring 852 (5), front contact and left-hand armature of relay 824, to ground through the back contact and outer right-hand armature of relay 822. Sequence switch 810 advances into position 6 where the power circuit for up-drive magnet 868 is again closed through the upper contacts of sequence switch spring 855 and the left-hand armature of relay 824. The brushes of the translator switch are driven over the terminals in the second group of twenty terminals to search for a set therein identified by the depressed vertical key. When the desired set of terminals are reached, the commutator brush 733 encounters the contact 761 and a circuit is established from battery, through the winding of relay 825, lower right-hand contact of sequence switch spring 835 (1¾+6), upper left-hand contact of said spring (5¾+6), brush 733, contact 761, conductor 639, left-hand contacts of key 632, conductor 640, upper left-hand contact of sequence switch spring 844 (5+6) to ground. Relay 825 operates and opens the energizing circuit for relay 824. Relay 824, however, remains energized for an instant longer in a holding circuit traceable from battery through its winding and right-hand armature and contact, conductor 870, commutator 762, brush 732 to ground. When the brushes of the translator switch are accurately centered on the selected set of terminals, commutator brush 732 encounters an insulating segment of commutator 762 and relay 824 releases its armatures to open the power circuit of magnet 868. The switch 700 thereupon ceases its upward movement. Relay 824 also completes a circuit from battery through the magnet of sequence switch 810, lower left-hand contact of sequence switch spring 852 (6), back contact and left-hand armature of relay 824 to ground at the outer right-hand armature of relay 822 for advancing sequence switch 810 into position 7.

As sequence switch 810 passes through position 6¾, relay 901 of the test circuit and relay 706 are operated over a circuit from ground at the left-hand normal contacts of relay 988, winding of relay 901, outer left-hand armature and back contact of relay 902, contacts 912, right-hand contacts of sequence switch spring 838 (6¾+7), lower contacts of sequence switch spring 717 (1), winding of relay 706 and back contact and inner right-hand armature of relay 822 to battery. With the sequence switch 810 in position 7, a circuit is completed as follows: ground, left-hand armature and back contact of relay 988, winding of relay 901, outer left-hand armature and front contact of relay 901, winding of relay 902, contacts 911, outer left-hand armature and front contact of relay 706, lower lefthand contact of sequence switch spring 835 (7+11), upper right-hand contact of said spring (7+11) winding of relay 706, and back contact and inner right-hand armature of relay 822 to ground. During the testing operation, the relays 706, 902 and 901 are locked up in series with each other. Relay 902 closes a circuit from battery through sequence switch magnet 920, the upper right-hand contact of spring 921 (2) to ground at the outer right-hand armature and contact of relay 902, for driving sequence switch 920 into position 3.

*Setting of translator registers in accordance with the office designation.*

When the sequence switch 810 reaches position 7 a circuit is closed from battery through the winding of relay 821, outer right-hand armature of relay 830, upper right-hand contact of sequence switch spring 854 (7+8) to ground. Relay 821 becomes energized and extends the impulse leads 861 to 866, inclusive, from the translator brushes through to the relays 814, 813, 812, 811, 809 and 808, respectively. As the impulse machine 790 rotates these relays are operated in combinations determined by the contacts of the impulse drums encountered by its brushes. With the particular combinations of the relays 808, 809, 811, etc., energized when said impulse drums are in a certain position in their cycle, impulses are transmitted from the impulse machine over leads 858, 859, 860 and 889 to cause the energization of certain of the translator register relays. When the impulse machine rotates to a new position, a different combination of relays 808, 809, 811, etc., are operated and impulses are sent over the leads 858, 859, 860 or 889 to cause the operation of other translator register relays. This procedure continues for a complete rotation of the impulse machine at the end of which time the entire office record has been produced on the translator register relays by means of impulses sent from the impulse machine. In order that the transmission of impulses from the impulse machine may commence the instant relay 821 operates regardless of what position the impulse machine may be in, in its cycle of rotation, a counting device consisting of three pairs of counting relays 826, 827, 828, 829, 830 and 831 is provided to measure off a complete rotation of the impulse machine. For simplicity, however, it will be assumed that the relative positions of the brushes and the contacts of the impulse machine are as shown in the drawing, at the instant sequence switch 810 reaches position 7 and relay 821 operates, consequently, an instant later the brushes 776, 777, 778 and 764 encounter the metallic segments 783, 782, 779 and 767 on the surface of the impulse machine. A circuit is thereupon closed from battery through the contact 783, brush 776, terminal 742, brush 736, conductor 865, next to the inner left armature of relay 821, conductor 873, winding of relay 809 to ground. A circuit is also closed from battery through the contact 782, brush 777, terminal 741, brush 735, conductor 866, innermost left armature of relay 821, winding of relay 808 to ground. Consequently, relays 808 and 809 are energized and the remaining four relays 811, 812, etc., remain deenergized. At the same time a circuit is completed from battery through the contact 779, brush 778, inner right-hand armature and contact of relay 821, back contact and outer-most left-hand armature of relay 830, winding of relay 823 to ground. Relay 823 operates and completes a circuit from ground through its armature and contact, left-hand armature and back contact of relay 826, winding of relay 827 to battery. Relay 827 operates and completes a circuit from battery through its winding, winding of relay 826, contact and armature of relay 827, upper left-hand contact of sequence switch spring 854 (6¾+17), to ground. Relay 826, however, does not operate in this circuit since it is shunted by the direct circuit to ground at the contact and armature of relay 823. Relay 808 in energizing, closes a circuit for the energization of relay 815 and relay 809 closes a similar circuit for relay 816. With relay 815 operated, a circuit is closed from battery through the contact 767 of the impulse machine, brush 764, conductor 858, next to the inner armature and contact of relay 815, left-hand winding of relay 894 to ground. Relay 894 locks in a circuit from battery through its right-hand winding and contact, and inner right-hand armature to ground at the lower left-hand contact of sequence switch spring 844 (7+11). A circuit is also closed from battery over conductor 858, through the next to the innermost armature and contact of relay 816, left-hand winding of relay 800 to ground. Relay 800 locks in a circuit to battery through its right-hand winding and inner right-hand armature and contact to ground through the lower right-hand contact of sequence switch spring 844 (7+11).

The impulse machine by continuing to rotate disengages its brushes from the first vertical row of contacts shown on the developed surface and engages them with the second vertical row of contacts, thereby permitting the relays 808 and 809 to become deenergized. As the brush 778 disengages the contacts 779, the circuit of relay 823 is opened and this relay becomes deenergized to remove the short circuit from around the winding of relay 826. Consequently relay 826 actuates and locks in series with relay 827. With the brushes of the impulse machine on the second vertical row of contacts a new combination of impulse circuits is established. One of these circuits may be traced from battery, through the contact 789, brush 771, terminal 746, brush 740, conductor 861, outermost left armature and contact of relay 821, conductor 875 and winding of relay 814 to ground. Another circuit may be traced from battery, through the contact 787, brush 773, terminal 745, brush 739, conductor 862, next to the outer armature and contact of relay 821, conductor 876, winding of relay 813 to ground. Another circuit leads from battery, through the contact 785, brush 775, terminal 743, brush 737, conductor 864, third from the outermost armature and contact of relay 821, conductor 877, winding of relay 811 to ground. Relays 811, 813 and 814 operate and close energizing circuits respectively for relays 817, 819 and 820. A circuit is also completed from battery through the contact 780, brush 778, inner right hand armature and front contact of relay 821, contact and outer left hand armature of relay 830, winding of relay 823 to ground. Relay 823 operates and closes a circuit from ground through its armature and contact, armature and front contact of relay 826, armature and back contact of relay 828, winding of relay 829 to battery, causing the energization of this latter relay. Relay 829 upon operating completes a circuit from battery, through its winding and the winding of relay 828 in series, contact and armature of relay 829 and thence to ground as above traced through the upper left hand contact of sequence switch spring 854. Relay 828 however, remains inactive due to the direct circuit to ground through the armature and contact of relay 823, which is maintained as long as the brush 778 remains in engagement with contact 780. In the second position of the impulse machine battery is connected through the contact 768 and brush 765 to conductor 859. A circuit is therefore completed from battery over conductor 859, through the next to the outer armature and back contact of relay 817, left hand winding of relay 802 to ground. Relay 802 operates and locks in circuit from battery through its right hand winding and right hand armature to ground at the lower left hand contact of sequence switch spring 844 (7+11). A second circuit is closed from battery over the lead 859, through the next to the outer armature and back contact of relay 819, left hand winding of relay 805 to ground. Relay 805 energizes and locks in circuit through its right hand winding to ground at sequence switch spring 844 (7+11). Still another circuit is completed from battery through conductor 859, next to the outer armature and contact of relay 820, left hand winding of relay 806 to ground. Relay 806 operates, and it then locks through its right hand winding to ground at the sequence switch spring 844 (7+11).

The continued rotation of the impulse machine causes the brushes to disengage the second position contacts and to engage with the third vertical row of contacts. As the brush 778 leaves contacts 780, the circuit of relay 823 is opened and this relay deenergizes to open the shunt around the winding of relay 828. Relay 828 thereupon operates and remains energized in series with relay 829.

In the third position of the impulse machine a plurality of circuits is established. One of these may be traced from battery, through the contact 791, brush 771, terminal 746, brush 740, and thence as heretofore described through the winding of relay 814 to ground. Another circuit leads from battery, through the contact 784, brush 776, terminal 742, brush 736, conductor 865, next to the innermost armature and contact of relay 821, conductor 873, winding of relay 809 to ground. Relays 809 and 814 operate and respectively close energizing circuits for relays 816 and 820. Since brush 766 is at this time in engagement with contact 769, battery potential is connected to the conductor 860 and consequently a circuit is extended through the outermost armature and contact of relay 816, left hand winding of relay 801, to ground. Another circuit is completed from battery, over conductor 860, through the outermost armature and contact of relay 820, left hand winding of relay 807 to ground. Relays 801 and 807 lock in circuits through their right hand windings, and to ground at the lower right hand contact of sequence switch spring 844.

The impulse machine continues to rotate, and disengages its brushes from its third position contacts, permitting relays 809 and 814 to release, and engages the brushes with the vertical row of contacts in the fourth position. A plurality of circuits is now completed, one of which may be traced from battery through contact 788, brush 773, terminal 745, brush 739, conductor 862, next to the outermost armature and contact of relay 821, conductor 876, winding of relay 813 to ground. Another circuit leads from battery through the contact 786, brush 774, terminal 744, brush 738, conductor 863, second from the outermost armature and contact of relay 821, conductor 878, winding of relay 812 to ground. Relays 812 and 813 now operate and close circuits respectively for relays 818 and 819. A circuit is also closed from battery, through the contact 781, brush 778, inner right hand armature and contact of relay 821, contact and outer left hand armature of relay 830, winding of relay 823 to ground. Relay 823 completes a circuit from ground, through its armature and contact, left hand armature and front contact of relay 826, left hand armature and front contact of relay 828, inner left hand armature and contact of relay 830, winding of relay 831 to battery. Relay 831 energizes and closes a circuit for itself in series with relay 830. Relay 830, however, does not energize at this time since its winding is shunted by a direct circuit to ground at the contact and armature of relay 823. With the impulse machine in its fourth position or at the completion of a revolution the brush 763 engages contact 770 and battery potential is connected to the conductor 889, establishing a circuit from battery, over the conductor 889, through the innermost armature and contact of relay 818, left hand winding of relay 803 to ground. A second circuit is closed from battery over the conductor 889, through the innermost armature and contact of relay 819, left hand winding of relay 804 to ground. Relays 803 and 804 operate and lock in circuits through their right hand windings, to ground at sequence switch spring 844. The impulse machine has now rotated through a complete revolution and the office record is now recorded on the translator register relays. As soon as the brush 778 leaves contact 781, relay 823 becomes deenergized and opens the shunt circuit around the winding of relay 830, permitting this relay to operate in series with relay 831. Relay 830 at its outer right hand armature opens the circuit of relay 821, and this latter relay deenergizes to disconnect the impulse leads from the brushes of the translator switch whereby the continued rotation of the impulse machine will not cause further sending of impulses into the translator register circuit.

*Setting of numerical registers from the operator's keyboard.*

At the time the sequence switch 810 passes into position 7 following the operation of the translator switch, the sequence switch 710 is in position 1, sequence switch 920 is in position 3, sequence switch 981 is in position 1, and relays 706, 901 and 902 are all locked in series with each other. Relay 706 upon energizing completes a circuit which extends from battery through the windings of relays 624, 625, 626 and 627 in parallel to conductor 641, through the front contact and outer right hand armature of relay 706, contacts of sequence switch spring 719 (1+6), upper left hand contact of sequence switch spring 851 (1¾+7), to ground. Relays 624, 625, 626 and 627 operate and complete the control leads to the numerical keys. A circuit is now established from battery, through the winding of sequence switch magnet 710, lower left hand contact of sequence switch spring 711 (1), front contact and inner right hand armature of relay 706, upper contact of sequence switch spring 718 (1), conductor 642, contact and innermost armature of relay 624, to ground through the contact 616. Contact 616 is common to the row of keys including the stations and start key, and is closed on the depression of any one thereof. Sequence switch 710 consequently advances from position 1 into position 2.

In position 2 of sequence switch 710 a circuit is closed from battery, through the resistance 842, upper left hand contact of sequence switch spring 720 (2), thence to ground over two paths, one of which leads through the winding of relay 703 and the other through the back contact and lower armature of relay 703 and the normally closed contact at the inner left hand armature of relay 704. Due to the shunt around the winding of relay 703, this relay remains inert. A circuit is completed from ground, through the upper armature and contact of relay 703, left hand low resistance winding of relay 704, lower right hand contact of sequence switch spring 714 (1+4), upper left hand contact of said sequence switch spring (2), conductor 643, right hand contacts of thousands key 617, next to the outer armature and contact of relay 626, conductor 644, upper left hand contact of sequence switch spring 728 (2), lower right hand contact of said spring (1+5), conductor 792, contacts 909, inner right hand contacts of relay 901, upper right hand contact of sequence switch spring 931 (2¾+3), lower contact of said sequence switch spring (2+3), and left hand winding of relay 1002 to battery. Although relay 1002 is marginal, it becomes energized, since only the low resistance winding of relay 704 is included in series therewith. Relay 1002 locks up in a circuit from battery, through its right hand winding and inner right hand contacts, conductor 1003, upper left hand contact of sequence switch spring 940 (2+13), to ground. Relay 704 also operates and locks in series with relay 1002, said locking circuit including the left hand winding of relay 1002 and the inner left hand alternate contacts of relay 704. Relay 704 in operating removes the shunt from around the winding of relay 703, and this latter relay becomes energized. Another circuit is closed from battery, through the low resistance 622, and high resistance 623, left hand contacts of key 617, innermost armature and contact of relay 627, conductor 645, upper left hand contact of sequence switch spring 725 (1¾+2), lower right hand contact of said spring (1+5), conductor 793, contacts 903, inner left hand contacts of relay 901, upper right hand contact of sequence switch spring 932 (2¾+3), lower right hand contact of said sequence switch spring (2+3), right hand winding of marginal relay 1011, and right hand winding of relay 1012 to ground. Relay 1012, being sensitive, operates, but due to the marginal character of relay 1011, said latter relay does not energize since the high resistance 623 is included in the circuit thereof. Relay 1012 locks up in a circuit including battery, left hand winding and contacts of relay 1012, conductor 1003, and ground at the upper left hand contact of sequence switch spring 940. Upon the energization of relay 704, a circuit is closed from battery through the low resistance 722, right hand armature and contact of relay 704, high resistance 721, lower right hand contact of sequence switch spring 724 (2), conductor 794, contacts 908, inner left hand armature and contact of relay 902, right armature and contact of relay 1010, lower right hand winding of relay 1010, lower right hand contact of sequence switch spring 972 (3), and winding of relay 961 to ground. Relay 961 operates, but due to the high resistance 721 the marginal relay 1010 remains inactive.

With the thousands register relays 1002 and 1012 of the testing apparatus operated, lamp 2 of the matching lamps and the lamp TH of the progress lamps, light over a circuit including battery, lamp 1242, right hand contacts of the number 2 thousands key, lamp TH, lower left hand contact of sequence switch 950 (1), and ground at the upper right hand contact of sequence switch spring 951 (3). Register lamp 1202 lights and relay 960 operates over a path extending from ground, through the upper contact of sequence switch spring 951 (3), right hand contact of sequence switch spring 950 (1), right hand armature and front contact of relay 1012, left hand armature and front contact of relay 1002, right hand armature and back contact of relay 1011, outer left hand armature and back contact of relay 1013, over lead 2 to the like numbered lead 2 of Fig. 5, and thence in parallel, one path extending through lamp 1202 and resistance 1222, to battery, and the other path extending through the left hand contacts of the operated thousands key No. 2, upper left hand contacts of sequence switch spring 1250 (3), through the winding of relay 960 to battery. Relay 960 operates in this circuit and completes a circuit as follows: from battery, through the winding of magnet 920, armature and front contact of relay 961, lower right hand contact of sequence switch spring 963 (3), upper left hand contact of sequence switch spring 963, back contact and armature of relay 956, lower left hand contact of sequence switch spring 964 (3+11), right hand normal contacts of key 965, and right hand contacts of relay 960 to ground. Sequence switch 920 moves from position 3 into position 4. As the switch 920 advances out of position 3, the matching lamp 1242, the register lamp 1202, and the thousands lamp TH are extinguished, and the relays 961 and 960 release. As the sequence switch 920 passes through position 3½, relay 980 operates over a circuit including battery, winding of relay 980, outer left hand armature and back contact of relay 960, and ground at the lower right hand contact of sequence switch spring 943 (3½). Relay 980 in operating locks over a circuit including battery, winding right hand armature and front contact of relay 980 and ground at the contact of sequence switch spring 985 (1), and completes a circuit for sequence switch magnet 981 over a path including battery, winding of magnet 981, lower right hand contacts of sequence switch spring 986 (1), and ground at the left hand contacts of relay 980. Magnet 981 operates and drives the sequence switch from position 1 into position 2. In passing from position 3 into position 4, the sequence switch 920 also opens at the sequence switch spring contact 931, the holding circuit of relay 704. Relay 704 upon deenergizing completes a circuit from battery, through the winding of sequence switch magnet 710, upper right hand contact of spring 711 (2), contact and left hand armature of relay 702, front contact and lower armature of relay 703, normally closed contacts of the inner left hand armature of relay 704 to ground, moving sequence switch 710 out of position 2 into position 3. In passing from position 2 into position 3, contact 720 (2) is opened and relay 703 releases.

In position 3 of sequence switch 710 a circuit is closed from battery, through resistance 842, lower right hand contact of sequence switch spring 720 (3), and thence to ground over two paths, one of which leads through the winding of relay 701, and the other through the back contact and lower armature of relay 701 and the normally closed contacts at the inner right hand armature of relay 702. Due to the shunt around the winding of relay 701, it fails to operate at this time. Another circuit is closed from ground, through the upper armature and contact of relay 701, through the right hand low and left hand high resistance windings of relay 702, lower left hand contact of sequence switch spring 725 (3), lower right hand contact of said spring (1+5), conductor 793, contacts 903, inner left hand armature and front contact of relay 901, upper right hand contacts of sequence switch spring 970 (3¾+4), lower right hand contacts of said sequence switch spring (3+4), left hand winding of relay 1040, to battery. Relay 1040, being marginal, does not energize in series with the high resistance winding of relay 702. Relay 702, however, operates and closes a holding circuit for itself in series with relay 1040 through the inner right hand armature and front contact of relay 702. When relay 702 operates it removes the shunt from around the winding of relay 701, and this latter relay attracts its armatures. Another circuit is closed from battery, through the low resistance 622, left hand contacts of key 618, outermost armature and contact of relay 626, conductor 646, upper left hand contact of sequence switch spring 726 (2¾+3), lower right hand contact of sequence switch spring 728 (1+5), conductor 792, contacts 909, inner right hand armature and front contact of relay 901, upper left hand contacts of sequence switch spring 930 (3¾+4), lower right hand contacts of sequence switch spring 930 (3+4), right hand windings of relays 1041 and 1042, to ground. Since only the low resistance 622 is included in the circuit, both the relay 1042 and the marginal relay 1041 are energized. These relays lock in circuits closed through their left hand windings to the grounded conductor 1003. When relay 702 operates, it closes a circuit from battery, through the low resistance 722, outer right hand armature and front contact of relay 702, high resistance 721, lower right hand contact of sequence switch spring 709 (3), conductor 795, contacts 904, outer right hand armature and front contact of relay 902, right hand winding of marginal relay 1044, lower right hand contact of sequence switch spring 955 (4), and winding of relay 956 to ground. Relay 956 becomes energized, but relay 1044, being marginal, does not operate in series with the high resistance 721.

The No. 4 hundreds matching lamp and the H progress lamp then light over a circuit extending from battery, through the matching lamp 1244, the right hand contacts of the No. 4 hundreds key, progress lamp H, lower contact of sequence switch spring 958 (2), upper contact of sequence switch spring 958 (2), and lower contacts of sequence switch spring 951 (4), to ground. The number 4 register lamp is lighted and relay 960 is operated over a path extending from ground, through the lower right hand contact of sequence switch spring 951 (4), upper right hand contact of sequence switch spring 958 (2), right hand armature and front contact of relay 1042, left hand armature and back contact of relay 1040, outer left hand armature and front contact of relay 1041, outer left hand armature and back contact of relay 1044, over the lead 4 and thence in parallel one path extending through the register lamp 1204 and resistance 1224 to battery, and the other path extending through the left hand contacts of the number 4 hundreds key, lower left hand contacts of sequence switch spring 1250 (4) and the winding of relay 960 to battery. Relay 960, in operating, completes a circuit for driving the sequence switch 920 from position 4 to position 5, said circuit extending as follows: from ground, through the right hand armature and front contact of relay 960, right hand contacts of key 965, lower left hand contact of sequence switch spring 964 (3+11), armature and front contact of relay 956, upper right hand contact of sequence switch spring 963 (4), lower left hand contact of sequence switch spring 963 (4), back contact and armature of relay 961, and winding of magnet 920 to battery. As the sequence switch 920 advances out of position 4, the lighted register, matching and progress lamps are extinguished and the relays 956 and 960 are released. As the sequence switch 920 passes through position 4½, relay 980 operates over a circuit extending from battery, through the winding of relay 980, outer left hand armature and back contact of relay 960, lower right hand contact of sequence switch spring 943 (4½) to ground. Relay 980, in operating, locks over an obvious circuit to ground at sequence switch spring 985 (2) and completes a circuit for magnet 981 over a path extending from battery, through the winding of sequence switch magnet 981, lower right hand contact of sequence switch spring 986 (2), and front contact and left hand armature of relay 980 to ground. Magnet 981 in operating drives the sequence switch from position 2 into position 3. When sequence switch 920 leaves position 4 it also opens the circuit of relay 702 and this relay becomes deenergized. Relay 702, on releasing, completes a circuit from battery, through the winding of sequence switch 710, lower right hand contact of spring 711 (3), contact and outer left hand armature of relay 704, front contact and lower armature of relay 701, to ground at the normally closed contacts of relay 702. Sequence switch 710 advances out of position 3 and into position 4.

In position 4 of sequence switch 710, the circuit hereinbefore traced is closed from battery, through resistance 842, left contact of sequence switch spring 839 thence through the winding of relay 703 to ground, relay 703 remaining deenergized. A circuit is also closed from ground, through the upper armature and contact of relay 703, left hand and right hand windings of relay 704 in series, lower left hand contact of sequence switch spring 726 (4), lower right hand contact of spring 728 (1+5), conductor 792, contacts 909, inner right hand armature and front contact of relay 901, upper right hand contact of sequence switch spring 931 (4¾+5), upper left hand contact of sequence switch spring 946 (5), and left hand winding of relay 1060 to battery. Relay 1060, being marginal, does not operate in series with high resistance winding of relay 704. Relay 704, however, operates, removing the shunt from relay 703 and allows this latter relay to energize. Relay 704 locks at its inner left hand armature and contact in series with relay 1060. Another circuit is closed from battery, through the low resistance 622, left hand contacts of key 619, innermost armature and contact of relay 626, conductor 647, upper right hand contact of spring 725 (3¾+4), lower right hand contact of said spring (1+5), conductor 793, contacts 903, inner left hand armature and front contact of relay 901, upper right hand contact of sequence switch spring 932 (5), lower left hand contact of sequence switch spring 971 (4+5), and right hand windings of marginal relay 1061 and relay 1062 to ground. Since only the low resistance 622 is included in this circuit, both relays 1061 and 1062 operate. These relays lock in circuits including their left hand windings to ground on conductor 1003 through the upper left hand contact of spring 940 (2+13). When relay 704 operates, it closes a circuit from battery, through the low resistance 722, right hand armature and contact of said relay, high resistance 721, lower right hand contact of sequence switch spring 724 (4), conductor 794, contacts 908, inner left hand armature and front contact of relay 902, right hand winding of marginal relay 1063, upper right hand contact of sequence switch spring 972 (5), and winding of relay 961 to ground. Relay 1063, being marginal, does not operate, but relay 961 becomes energized. In position 4 of the sequence switch 710 another circuit is completed extending from ground on conductor 637, through the right hand contacts of stations key M, next to the innermost armature and front contact of relay 624, lower left hand contact of sequence switch spring 709 (3¾+4), conductor 795, contacts 904, outer right hand armature and front contact of relay 902, lower left hand contact of sequence switch spring 975 (4¾+5), upper left hand contact of said sequence switch spring (4+5) and left hand winding of marginal relay 1080 to battery. Relay 1080 operates in this circuit and locks through its right hand winding and inner right hand contacts to ground over conductor 1130 and the upper right hand contact of sequence switch spring 940 (2+13). The energization of the stations register relay 1080 at the time that the tens impulses are being transmitted to the tens register relays, is for the purpose of assisting in the control of the stations test which will be explained more in detail hereafter.

The No. 4 tens lamp and the progress lamp T now light over a circuit extending from battery, through the matching lamp 1244, right hand contacts of the No. 4 tens key, progress lamp T, upper contact of sequence switch spring 990 (3), lower right hand contact of sequence switch spring 981 (5), to ground. Relay 960 now operates, and register lamp 1204 lights over a path extending from ground, through the lower right hand contacts of sequence switch spring 981 (5), lower contact of sequence switch spring 990 (3), right hand armature and front contact of relay 1062, left hand armature and back contact of relay 1060, outer left hand armature and front contact of relay 1061, outer left hand armature and back contact of relay 1063, over the cross-connection 4, and thence in parallel, one path extending through lamp 1204 and resistance 1224 to battery, and the other path extending through the left hand contacts of the No. 4 tens key, lower right hand contacts of sequence switch spring 1250 (5), and winding of relay 960 to battery. Relay 960 in operating completes a circuit as follows: ground, right hand armature and contact of relay 960, right hand contacts of key 965, lower left hand contact of sequence switch spring 964 (3+11), left hand armature and back contact of relay 956, upper left hand contact of sequence switch spring 963 (5), lower right hand contacts of sequence switch spring 963 (5), front contact and armature of relay 961, and sequence switch magnet 920 to battery, driving the sequence switch from position 5 into position 6. As the sequence switch 920 advances out of position 5, the lamps 1204, 1244 and H are extinguished, and the relays 961 and 960 are released. On leaving position 5, sequence switch 920 opens the circuit of relay 704, and this relay becomes deenergized. As the sequence switch 920 passes through position 5½, relay 980 is energized over a circuit extending from battery, through the winding of relay 980, outer left hand armature and back contact of relay 960, lower right hand contact of sequence switch spring 943 (5½) to ground. Relay 980, in operating, locks through its right hand contacts to ground at sequence switch 985 (3), and completes a circuit for sequence switch magnet 981, extending from battery, through the winding of magnet 981, lower right hand contact of sequence switch spring 986 (3), and left hand contacts of relay 980 to ground, driving the sequence switch 981 from position 3 into position 4. With relay 704 deenergized and relay 703 energized, a circuit is closed from battery, through the winding of sequence switch magnet 710, upper right hand contact of spring 711 (4), contact and left hand armature of relay 702, front contact and lower armature of relay 703, to ground at the normal contacts of relay 704. Sequence switch 710 advances from position 4 into position 5.

In position 5 of sequence switch 710, the circuit heretofore traced is completed through the winding of relay 701, to ground at the right hand contacts of relay 702, relay 701 remaining deenergized. Another circuit is established from ground, through the upper armature and contact of relay 701, right hand low resistance winding of relay 702, lower right hand contact of spring 729 (1+5), upper right hand contact of said spring, conductor 648, outermost armature and contact of relay 624, right hand contacts of key 620, innermost armature and contact of relay 625, conductor 649, lower right hand contact of spring 727 (5), lower right hand contact of spring 725 (1+5), conductor 793, contacts 903, inner left hand armature and front contact of relay 901, upper right hand contact of sequence switch spring 970 (5¾+7), lower left hand contact of sequence switch spring 970 (5+7), and left hand winding of relay 1070 to battery. Relay 1070 becomes energized and locks through its right hand armature and contact to ground on conductor 1003. Relay 702 also becomes energized and locks through its inner right hand armature and front contact to ground in series with the register relay 1070. The operation of relay 702 permits the energization of relay 701, as previously described. Still another circuit is completed from battery, through the low resistance 622, left hand contacts of key 620, next to the inner armature and contact of relay 625, conductor 650, upper right hand contact of spring 726 (4¾+5), lower right hand contact of spring 728 (1+5), conductor 792, contacts 909, inner right hand armature and front contact of relay 901, upper left hand contact of sequence switch spring 930 (5¾+7), lower left hand contact of sequence switch spring 930 (5+7), and right hand winding of marginal relay 1071 and right hand winding of relay 1072 to ground. Since only the resistance 622 is included in the circuit, both relays 1071 and 1072 are operated. These relays lock through their left hand windings to ground on conductor 1003. When relay 702 operates, it closes a circuit from battery, through low resistance 722, outer right hand armature and contact of relay 702, high resistance 721, lower right hand contact of sequence switch spring 709 (5), conductor 795, contacts 904, outer right hand armature and front contact of relay 902, right hand winding of relay 1073, upper right hand contact of sequence switch spring 955 (6+7), and winding of relay 956 to ground. Relay 956 operates in this circuit, but marginal relay 1073 is prevented from operating by the high resistance 721. In position 5 of the sequence switch 710 another circuit is completed extending from ground on conductor 637, through resistance 699, left hand contacts of the stations key M, next to the outer armature and front contact of relay 624, upper left hand contacts of sequence switch spring 724 (4¾+5), conductor 794, contacts 908, inner left hand armature and front contact of relay 902, lower left hand contact of sequence switch spring 976 (5¾+7), upper right hand contact of said spring (5+7), right hand windings of marginal relay 1083 and relay 1082 to battery. Relay 1083 being marginal does not energize in series with the high resistance 699. Relay 1082 however, energizes in the circuit just traced and locks over a circuit including the left hand winding of relay 1082, and conductor 1130 to ground at the upper right hand contact of sequence switch spring 940 (2+13). Relay 1082, in operating, assists in the control of the stations test. The circuits controlled by this relay will be later described.

With the register relays of the units group operated, the lamp 1243 and the U progress lamp light over a circuit extending from battery, through the lamp 1243, right hand contacts of the units key No. 3, through the lamp U, upper contact of sequence switch spring 991 (4), lower left contact of sequence switch spring 982 (6), to ground. Relay 960 is operated, and the register lamp 1203 is now lighted over a circuit extending from ground, through the lower left hand contact of sequence switch spring 982 (6), lower contact of sequence switch spring 991 (4), right hand armature and front contact of relay 1072, left hand armature and front contact of relay 1070, right hand armature and front contact of relay 1071, outer right hand armature and back contact of relay 1073, over the cross-connection 3, and thence in parallel, one path extending through lamp 1203 and resistance 1223 to battery, and the other path extending through left hand contacts of the No. 3 units key, upper right hand contacts of sequence switch spring 1251 (6), and winding of relay 960 to battery. Relay 960 in operating completes a circuit for sequence switch magnet 920 over a path extending from ground through the right hand armature and front contact of relay 960, right hand contacts of key 965, lower left hand contact of sequence switch spring 964 (3+11), left hand armature and front contact of relay 956, upper right hand contact of sequence switch spring 963 (6+7), lower left hand contact of sequence switch spring 963 (6+7), back contact and armature of relay 961, and winding of sequence switch magnet 920 to battery, driving the sequence switch from position 6 into position 7. As the sequence switch 920 advances out of position 6, the lamps 1203, 1243 and U are extinguished, and the relay 960 is released. As the switch 920 passes through position 6½, relay 980 operates over a circuit extending from battery, through the winding of relay 980, outer left hand armature and back contact of relay 960, lower right hand contact of sequence switch spring 943 (6½) to ground. Relay 980, in operating, locks over an obvious circuit to ground at the sequence switch spring 985 (4), and completes a circuit through its left hand armature and sequence switch spring 986 (4) for magnet 981, driving the sequence switch 981 from position 4 into position 5. Sequence switch 920, on leaving position 6, does not open the energizing circuit of relay 702, and this relay remains energized in series with relay 956.

It will be remembered that while the translator control circuit was in position 4, that is, during the transmission of the tens impulses to the register relays of the testing device, relay 1080 of the stations register of the testing device was operated and that while the translator circuit was in position 5, that is, during the transmission of the units impulses to the register relays of the testing device relay 1082 of the stations register of the testing device was operated. With these two relays operated, and with the sequence switch 920 in position 7, and the sequence switch 981 in position 5, the lamp 1244 and the progress lamp Sta light over a circuit extending from battery through lamp 1244, right hand contacts of stations key M, lamp Sta, upper contact of sequence switch spring 992 (5), outer left hand contact of sequence switch 982 (7) to ground. The register lamp 1204 is lighted and relay 960 is operated over a circuit from ground, upper left hand contact of sequence switch spring 982 (7), lower contact of sequence switch spring 992 (5), right hand armature and front contact of relay 1082, left hand armature and front contact of relay 1080, right hand armature and back contact of relay 1083 and thence in parallel over one path extending through lamp 1204 and resistance 1224 to battery and the other path extending through the left hand contacts of the stations key M, upper left hand contact of sequence switch spring 1251 (7), and winding of relay 960 to battery. Relay 960 in operating completes a circuit as follows: ground, right hand armature and front contact of relay 960, right hand contacts of key 965, lower left hand contact of sequence switch 964 (3+11), armature and front contact of relay 956, upper right hand contact of sequence switch 963 (6+7), lower left hand contact of said sequence switch spring (6+7), back contact and armature of relay 961, winding of sequence switch 920, driving the sequence switch 920 out of position 7 and into position 8. From position 8 switch 920 is advanced into position 9 over a circuit extending from battery through magnet 920, the upper right hand contact of spring 921 (8), contact 905, to ground at the lower contact of spring 833 (2+11).

*Release of office and numerical keys.*

Since the office and numerical keys are no longer needed in connection with the registration of the depressed keys on the operator's board, they are now restored. With sequence switch 710 in position 6, a circuit is closed from ground over conductor 637, thence through the windings of key release magnets 609, 608, 607, 606 and 605 in parallel, conductor 651, left hand contacts of sequence switch spring 727 (6), to battery. A second circuit is closed from ground on conductor 637, through the windings of key release magnets 611, 612, 613 and 614 in parallel, conductor 652, lower right hand contact of spring 726 (6+15), lower left hand contact of spring 728, (6+15), to battery. A third circuit is completed from ground on conductor 637, winding of magnet 615, right hand contacts of key 653 and thence over conductor 652 to battery. The key release magnets are all energized and serve to permit the release of the keys which are depressed. At the same time that sequence switch 710 reached position 6, a plurality of parallel circuits were established for relay 705, these circuits leading to the contacts of keys in each of the different rows. One of these circuits may be traced from battery, through the winding of relay 705, lower right hand contact of spring 723 (4+6), conductor 636, right hand contacts of key 633 to ground on the conductor 637. The circuit for the vertical row of keys may be traced from battery through the winding of relay 705, lower right hand contact of spring 731 (4+6), conductor 638, right hand contacts of key 632 to ground. Another branch leads from battery, through the winding of relay 705, lower left hand contact of spring 731 (4+6), conductor 644, next to the outermost armature and contact of relay 626, right hand contacts of key 617, conductor 643, left hand contacts of sequence switch spring 714 (5¾+6) to ground. Another circuit may be traced from battery, through the winding of relay 705, upper right hand contact of spring 731 (4+6), conductor 654, right hand contacts of key 618, over conductor 637 to ground. Still another circuit may be traced from battery, through the winding of relay 705, upper right hand contacts of spring 731 (4+6), thence over conductor 654, right hand contacts of key 619 to the grounded conductor 637. Another path may be traced from battery, through the winding of relay 705, contacts of sequence switch spring 730, conductor 649, innermost armature and contact of relay 625, right hand contacts of key 620, outermost armature and contact of relay 624, conductor 648, upper right and lower left hand contacts of sequence switch spring 729 to ground. Another circuit may be traced from battery, through the winding of relay 705, right hand contacts of sequence switch spring 708 (5+6), front contact and next to the innermost armature of relay 624, and right hand contacts of key M to ground over conductor 637. Relay 705 is energized and remains operated as long as any one of its several circuits is closed, or, in other words, until all of the actuated keys have been released.

When all keys have been released, relay 705 deenergizes and closes a circuit from battery through the winding of sequence switch magnet 710, upper left hand contact of spring 711 (6), armature and contact of relay 705 to ground, driving the sequence switch out of position 6 and into position 7. When sequence switch 710 leaves position 6, the circuits of the key release magnets and relays 624, 625, 626 and 627 are severed, permitting the same to become deenergized.

*Transfer of office record from translator register relays to the registers of the testing device.*

At the time sequence switch 710 reaches position 6, a circuit is closed from battery through the winding of relay 824, upper left hand contact of sequence switch spring 836 (7), lower left hand contact of sequence switch spring 713 (6) to ground. Relay 824 operates and locks in a circuit through its right hand armature and contact, left hand armature of relay 825 and through the upper left hand contact of spring 851 to ground. The operation of relay 824 serves as an indication that the numerical record has been completely set up in the registers of the test set. If, at this time, the translator register relays have all been set from the impulse machine, or as soon thereafter as such condition is brought about, a circuit is established from battery, through the winding of sequence switch magnet 810, upper right hand contact of spring 852 (7), contact and inner right hand armature of relay 830, front contact and left hand armature of relay 824 to ground at the outer right hand armature of relay 822. Sequence switch 810 advances to position 8 which is the position in which the transfer of the office record commences.

The class registration is the first to be transferred from the translator register relays to the corresponding registers in the test set. In position 8 of sequence switch 810, a circuit is closed from battery through resistance 842, left hand contact of spring 839 (8), thence in parallel through the winding of relay 703 and through the back contact and lower armature of said relay and the normally closed contacts of relay 704 to ground. Relay 703 being shunted remains deenergized. Another circuit is closed from ground through the upper armature and contact of relay 703, left and right hand windings of relay 704, conductor 879, contact and outer right hand armature of relay 801, upper right hand contact of spring 846 (8), conductor 792, contacts 909, inner right hand armature and front contact of relay 901, upper right hand contacts of sequence switch spring 931 (8¾+13), upper left hand contact of sequence switch spring 931, (8+9), right hand winding of relay 1101 to battery. Since relay 1101 is marginal, it fails to operate, but relay 704 attracts its armatures and locks, as heretofore described, at the same time permitting the energization of relay 703. Another circuit is closed from ground through the left hand armature and contact of relay 800, upper left hand contact of sequence switch spring 843 (7¾+8), conductor 795, contacts 904, outer right hand armature and contact of relay 902, lower left hand contact of sequence switch spring 975 (8¾+9), upper right hand contact of sequence switch spring 975 (8+9), right hand winding of relay 1102 to battery. Relay 1102 operates and locks up in a circuit from battery, through its left hand winding and inner left hand contacts, conductor 1130, upper right hand contacts of sequence switch 940 (2+13), to ground. Relay 1102 in operating completes an obvious circuit through its right hand contacts for operating relay 1104. When relay 704 operates, a circuit is closed from battery through the low resistance 722, right hand armature and contact of said relay 704, conductor 880, left hand armature and contact of relay 801, upper right hand contact of spring 847 (8), lower right hand contact of spring 848 (6+18), conductor 794, contacts 908, inner left hand armature and contact of relay 902, left hand winding of relay 1103, upper left hand contacts of spring 972 (9) and winding of relay 961 to ground. Relay 1103 operates and locks up over a circuit including its right hand winding and contacts to ground on conductor 1130.

The matching lamp 1242 and the class progress lamp Cl now light over a circuit extending from battery through lamp 1242, right hand contacts of class key No. 2, lamp Cl, upper contact of spring 993 (6), upper right hand contact of spring 982 (9) to ground. The register lamp 1202 lights and the relay 960 also operates over a circuit extending from ground, upper right hand contact of spring 982 (9), lower contact of spring 993 (6), right hand armature and back contact of relay 1101, left hand armature and front contact of relay 1103, right hand armature and back contact of relay 1106, inner right hand armature and front contact of relay 1104, over the cross-connection 2, and thence in parallel, one path extending through lamp 1202 and resistance 1222 to battery, and the other path extending through the left hand contacts of class key No. 2, lower left hand contacts of spring 1251 (9) and winding of relay 960 to battery. Relay 960 in operating completes a circuit extending from ground, through the right hand armature and front contact of relay 960, right hand contacts of key 965, lower left hand contacts of spring 964 (3+11), armature and back contact of relay 956, upper left hand contact of spring 963 (9), lower right hand contact of spring 963 (9), front contact and armature of relay 961, and winding of sequence switch magnet 920, driving the sequence switch 920 out of position 9 and into position 10. As the sequence switch 920 advances out of position 9, the lamps are extinguished and relays 960 and 961 are released. The lighting of the register lamp 1202 indicates to the testing operator that the translator has operated correctly. If it had not operated correctly, lamp 1202 would not have lighted and the sequence switch 920 would not have moved out of position 9.

As the sequence switch 920 passes through position 9½, relay 980 operates over a circuit including battery, winding of relay 980, outer left hand armature and back contact of relay 960, lower right hand contact of sequence switch spring 943 (9½), to ground. Relay 980 in operating locks over an obvious circuit to ground at the contact of the sequence switch spring 985 (6), and completes a circuit for magnet 981 over a path including battery, winding of magnet 981, lower right hand contact of sequence switch spring 986 (6), contact and left hand armature of relay 980 to ground, driving sequence switch 981 from position 6 into position 7. As the sequence switch 920 advances out of position 9, the holding circuit of relay 704 is opened at the sequence switch spring 931 (8+9), and this relay becomes deenergized. With relay 704 deenergized and relay 703 energized, a circuit is closed from battery through the winding of sequence switch magnet 810, upper right hand contact of sequence switch spring 853 (8), contact and left hand armature of relay 702, front contact and lower armature of relay 703, to ground at the normally closed contacts of relay 704. Sequence switch 810 moves out of position 8 and into position 9, opening the holding circuit of relay 703 at the sequence switch spring 839.

In position 9 of sequence switch 810, the district brush and office brush impulses are transferred from the translator registers to the registers of the testing device. With sequence switch 810 in position 9 and sequence switch 920 in position 10, a circuit is closed from battery through resistance 842, right hand contact of spring 839 (9), thence to ground over the parallel circuits, one of which leads through the winding of relay 701 and the other directly through the normally closed contacts of relay 702. A circuit is also closed from ground through the upper armature and contact of relay 701, right hand winding of relay 702, conductor 881, upper contact of sequence switch 845 (9), contact and left hand armature of the district brush register relay 802, contact and outer right hand armature of the office brush register relay 804, upper right hand contact of spring 850 (9), conductor 793, contacts 903, inner left hand armature and front contact of relay 901, upper right hand contact of sequence switch spring 970 (9¾+11), upper left hand contact of sequence switch 970 (9+11) and left hand winding of marginal relay 1105 to battery. Relay 1105 operates since only the low resistance winding of relays 702 is included in series therewith and locks through its right hand winding, conductor 1140, lower right hand contact of sequence switch spring 940 (2+13) to ground. Relay 702 also operates and locks to ground at its inner right hand armature and contact. Relay 701 now becomes energized, the shunt around its winding having been removed. When relay 702 operates, it closes a circuit from battery, through the low resistance 722, outer right hand armature and front contact of relay 702, conductor 880, contacts of sequence switch spring 882 (9), outer right hand armature and contact of office brush register relay 805, upper right hand contact of spring 843 (9), conductor 795, contacts 904, outer right hand armature and contacts of relay 902, left hand winding of marginal relay 1150, upper left hand contact of sequence switch spring 955 (10+11) and winding of relay 956 to ground. Both relays 1150 and 956 operate, relay 1150 locking over a circuit including battery, contact and inner right hand armature of relay 1150, conductor 1140, lower right hand contact of sequence switch spring 940 (2+13) to ground.

The No. 2 matching lamp and the progress lamp DB now light over a circuit extending from battery through the lamp 1242, right hand contacts of the No. 2 district brush key, lamp DB, upper contact of sequence switch spring 994 (7), lower right hand contact of sequence switch spring 944 (10) to ground. The register lamp 1202 also lights and relay 960 operates over a circuit from ground, lower right hand contact of sequence switch spring 944 (10), lower contact of sequence switch spring 994 (7), right hand armature and back contact of relay 1108, outer right hand armature and front contact of relay 1105, over the cross-connection 2, and thence in parallel, one path extending through lamp 1202, resistance 1222, and the other path extending through the left hand contacts of the No. 2 district brush key lower right hand contact of sequence switch spring 1251 (10) and winding of relay 960 to battery. Relay 960 in operating completes a circuit over a path from ground, right hand armature and contact of relay 960, right hand contact of key 965, lower left hand contact of sequence switch spring 964 (3+11), armature and front contact of relay 956, upper right hand contact of sequence switch spring 963 (10+11) lower left hand contact of sequence switch spring 963 (10+11), back contact and armature of relay 961 and winding of sequence switch magnet 920 to battery, driving the sequence switch 920 from position 10 into position 11. As the sequence switch 920 advances out of position 10, the lamps DB, 1242 and 1202 are extinguished and relay 960 is released. The lighting of the register lamp 1202 indicates that the translator has operated correctly. Relays 702 and 956 do not release as the sequence switch passes from position 10 to 11, since the sequence switch contacts included in their circuits are closed in positions 10 and 11. As the sequence switch 920 passes through position 10½, relay 980 operates over a circuit from battery, winding of relay 980, outer left hand armature and back contact of relay 960, lower right hand contact of sequence switch spring 943 (10½) to ground. Relay 980, in operating, locks over an obvious circuit and completes a circuit for sequence switch magnet 981 over a path from battery, winding of magnet 981, lower right hand contact of sequence switch spring 986 (7) and contact and left-hand armature of relay 980 to ground, driving sequence switch 981 from position 7 into position 8.

With the sequence switch 920, in position 11, and the sequence switch 981 in position 8, and the register relay 1150 operated, the matching lamp 1242 and the progress lamp OB light over a circuit from battery, lamp 1242, right hand contacts of the No. 2 office brush key, lamp OB, upper contact of sequence switch spring 995 (8), lower left hand contact of sequence switch spring 944 (11) to ground. The register lamp 1202 lights and the relay 960 operates over a path from ground, lower left hand contact of sequence switch spring 944 (11), lower contact of sequence switch spring 995 (8), right hand armature and back contact of relay 1152, outer right hand armature and front contact of relay 1150 over the cross connection 2, and thence in parallel, one path extending through lamp 1202, and resistance 1222 to battery and the other path extending through the left hand contacts of the No. 2 office brush key, upper right hand contact of sequence switch spring 1252 and winding of relay 960 to battery. Relay 960, in operating, completes a circuit for magnet 920 over a path from ground, right hand armature and contact of relay 960, right hand contacts of key 965, lower left hand contact of sequence switch spring 964

(3+11), armature and front contact of relay 956, upper right hand contact of sequence switch spring 963 (10+11), lower left hand contact of sequence switch spring 963 (10+11), back contact and armature of relay 961 and winding of magnet 920 to battery, driving the sequence switch 920 from position 11 into position 12. As sequence switch 920 advances out of position 11, relay 960 is released and lamps 1202, 1242 and OB are extinguished. As sequence switch 920 passes through position 11½, relay 980 is energized over a path from battery, winding of relay 980, outer left hand armature and back contact of relay 960, lower right hand contact of sequence switch spring 943 (11½) to ground. Relay 980, in operating, locks over an obvious circuit and completes a circuit for sequence switch magnet 981, said circuit extending from battery, winding of magnet 981, lower right hand contact of sequence switch spring 986 (8), contact and left hand armature of relay 980 to ground, driving sequence switch 981 from position 8 into position 9. Sequence switch 920, on leaving position 11, opens the holding circuit for relays 702 and 956 at the sequence switch spring 955 (10+11), and these relays release. A circuit is now closed from battery through the winding of sequence switch magnet 810, upper left hand contact of spring 853 (9), back contact and outer left-hand armature of relay 704, front contact and lower armature of relay 701 to ground, at the normal contacts of relay 702. Sequence switch 810 moves out of position 9 and into position 10.

In its 10th position, sequence switch 810 establishes a circuit from battery through resistance 842, left hand contact of spring 839 (10) and thence, as already traced, to ground over parallel paths, one including the winding of relay 703. At the same time, a circuit is established from ground through the upper armature and contact of relay 703, both windings of relay 704 in series, conductor 879, contact and outer right hand armature of district group register relay 803, left hand contacts of sequence switch spring 840 (10), conductor 792, contacts 909, inner right hand armature and contact of relay 901, upper right hand contact of sequence switch spring 931 (8¾+13), upper right hand contact of sequence switch spring 946 (11¾+12) and left hand winding of marginal relay 1170 to battery. Since relay 1170 is marginal, it does not operate in series with the high resistance winding of relay 704. Relay 704, however, attracts its armature and locks as hereinbefore explained, permitting the energization of relay 703. Another circuit is closed from battery through the low resistance 856, left hand armature and contact of register relay 803, upper left hand contact of sequence switch spring 850 (9¾+10), conductor 793, contacts 903, inner left hand armature and front contact of relay 901, upper right hand contact of sequence switch spring 932 (8¾+13), upper right hand contact of sequence switch spring 971 (11¾+12), right hand windings of relays 1171 and 1172 to ground. Both relays 1171 and 1172 become energized in this circuit and lock over their left hand windings to ground on the conductor 1140. When relay 704 operates, it closes a circuit from battery through low resistance 722, right hand armature and front contact of said relay, high resistance 721, upper right hand contact of spring 848 (10), lower right hand contact of said spring (6+18), conductor 794, contacts 908, inner left hand armature and front contact of relay 902, right hand winding of marginal relay 1174, lower left hand and upper left hand contact of sequence switch spring 973 (12) and winding of relay 961 to ground. Relay 1174 being marginal does not operate in series with the high resistance 721, but relay 961 becomes energized.

Matching lamp No. 1244 and the district group progress lamp DG now light over a circuit from battery, lamp 1244, right hand contacts of the No. 4 district group key, lamp DG, upper contact of sequence switch spring 996 (9), upper right hand contact of sequence switch spring 944 (12), to ground. The register lamp 1204 lights and relay 960 operates over a path from ground, upper right hand contact of sequence switch spring 944 (12), lower contact 996 (9), of sequence switch spring right hand armature and front contact of relay 1172, left hand armature and back contact of relay 1170, outer left hand armature and front contact of relay 1171, inner right hand armature and back contact of relay 1174, over the cross-connection 4, and thence in parallel on path extending through lamp 1204 and resistance 1224 to battery, and the other path extending through the left hand contacts of the No. 4 district group key, upper left hand contact of sequence switch spring 1252 (12) and winding of relay 960 to battery. Relay 960, in operating, completes a circuit for magnet 920 over a path from ground, right hand armature and front contact of relay 960, right hand contacts of key 965, left hand normal contacts of key 1191, outer left hand normal contacts of relay 1192, upper right hand contact of sequence switch spring 964 (12), armature and back contact of relay 956, upper left hand contact of sequence switch spring 963 (12), lower right hand contact of sequence switch spring 963 (12), front contact and armature of relay 961 and winding of magnet 920, driving the sequence switch 920 from position 12 into position 13. As sequence switch 920 advances out of position 12, the lamps 1204, 1244 and DG are extinguished and relay 960 is released. As the sequence switch passes through position 12½, relay 980 is operated over a circuit from battery, winding of relay 980, outer left hand armature and back contact of relay 960, lower right hand contact of sequence switch spring 943 (12½) to ground. Relay 980, in operating, locks in an obvious circuit and completes a circuit for sequence switch magnet 981 over a path from battery, winding of magnet 981, lower right hand contact of sequence switch spring 986 (9), front contact and left hand armature of relay 980 to ground, driving the sequence switch 981 out of position 9 and into position 10. Upon leaving position 12, the sequence switch 920 opens the holding circuit of relays 704 and 961 whereupon said relays release. A circuit is thereupon completed from battery through the winding of sequence switch magnet 810, upper right hand contact of spring 853 (10), and left hand armature contacts of relay 702, front contact and lower armature of relay 703 to ground at the normal contact of relay 704, moving sequence switch 810 into position 11.

In position 11 of sequence switch 810, the circuit heretofore traced in established from battery through the resistance 842 to ground through the relay 701 and also to ground in a parallel path. Another circuit is closed from ground through the upper armature and contact of relay 701, right hand lower resistance winding of relay 702, conductor 881, lower contact of spring 845 (11), contact and left hand armature of office group register relay 806, lower contact of sequence switch spring 850 (10¾+11), conductor 793, contacts 903, inner left hand armature and front contact of relay 901, upper right hand contact of sequence switch spring 932 (8¾+13), lower right hand contact of sequence switch spring 971 (12¾+13), left hand winding of relay 1162 to battery. Since only the low resistance winding of relay 702 is included in the circuit traced, the marginal relay 1162 operates and locks to the grounded conductor 1140. Relay 702 also energizes and locks, as heretofore explained, permitting the operation of relay 701. Relay 702, upon operation, establishes a circuit from battery through the low resistance 722, outer right hand armature and contact of said relay, conductor 880, left hand armature and contact of relay 807, left hand contacts of spring 849 (11), conductor 795, contacts 904, outer right hand armature and front contact of relay 902, right hand winding of relay 1164, right hand contact of sequence switch spring 973 (13) and winding of relay 956 to ground. Both relays 1164 and 956 are operated in this circuit. Relay 1164 locks through its left hand winding to ground on conductor 1140. Relay 1164, in operating, completes an obvious circuit through its outer right hand armature for operating relay 1165.

The matching lamp 1247 and the OG progress lamp now light over a path from battery, lamp 1247, right hand contacts of the No. 7 office group key, lamp OG, upper contact of sequence switch spring 997 (10) and upper left hand contact of sequence switch spring 944 (13) to ground. The register lamp 1207 now lights and the relay 960 now operates over a path from ground, upper left hand contact of sequence switch spring 944 (13) lower contact of sequence switch spring 997 (10), right hand armature and back contact of relay 1161, outer right hand armature and front contact of relay 1162, inner right hand armature and front contact of relay 1165 over the cross-connection 7, and thence in parallel, one path extending through lamp 1207 and resistance 1227 to battery and the other path extending through the left hand contacts of the No. 7 office group key, lower left hand contact of sequence switch spring 1252 (13) and winding of relay 960 to battery. Relay 960, in operating, completes a circuit for magnet 920 over a path from ground, right hand armature and front contact of relay 960, right hand contacts of key 965, left hand normal contacts of key 1194, outer left hand normal contacts of relay 1196, upper left hand contact of sequence switch spring 964 (13), left hand armature and front contact of relay 956, upper right hand contact of sequence switch spring 963 (13), lower left hand contact of sequence switch spring 963 (13), back contact and armature of relay 961, and winding of sequence switch magnet 920, driving the sequence switch 920 out of position 13 and into position 18. As the sequence switch 920 advances out of position 13, lamps 1207, 1247 and OG are extinguished and relay 960 and all operated relays of the registers of the test set are released. The lighting of the register lamps of the test set indicates that the translator is operating correctly. As the sequence switch 920 passes into position 13½, relay 980 is operated over a circuit including the winding of relay 980, outer armature and back contact of relay 960, lower right hand contact of sequence switch spring 943 (13½) to ground. Relay 980, in operating, locks up over an obvious circuit and completes a circuit through its left hand armature for sequence switch magnet 981 over a path from battery, winding of magnet 981, lower right hand contact of sequence switch spring 986 (10) and front contact and left hand armature of relay 980 to ground, driving the sequence switch 981 out of position 10 and into position 1. On leaving position 13, sequence switch 920 opens the holding circuit of relays 702 and 956 which deenergize. Sequence switch 810 is driven out of position 11 and into position 12 by means of a circuit from battery through the winding of its magnet, upper left hand contact of spring 853 (11), contact and outer left hand armature of relay 704, front contact and lower armature of relay 701 to ground at the normally closed contacts of relay 702.

*Restoration of the translator switch.*

At the time the sequence switch 810 moves into position 8 following the completion of the numerical registration on the registers of the testing device, it prepares for the restoration to normal of the translator switch 700. The translator switch should not be released at this time provided the office records have not been completely transferred from the impulse machine to the translator register relay. Consequently the circuit for the down-drive magnet 867 depends upon the arrival of sequence switch 810 into position 8 and also upon the deenergized condition of relay 821, which relay is released immediately following the completion of the office registration of the translator registers. The circuit for the power magnet 867 may be traced from battery through the winding of said magnet, back contact and outer right hand armature of relay 821, lower left hand contact of sequence switch spring 854 (8+16) to ground. Power magnet 867 causes the downward movement of brush shaft 734.

Following the transfer of the office record from the translator registers to the registers of the testing device in the manner heretofore described the sequence switch 810 finally arrives in position 12. When the translator switch is restored to its normal position, a circuit is closed from battery through the winding of relay 821, lower left hand contact of sequence switch spring 855 (7+17), lower right hand contact of said spring (7¾+16), normal position segment 796, brush 732, to ground. With relay 821 operated and sequence switch 810 in position 12, a circuit is closed from battery through the winding of the magnet of said sequence switch, upper left hand contact of sequence switch spring 834 (12), front contact and outer right hand armature of relay 821, lower left hand contact of spring 854 (8+16) to ground, driving sequence switch 810 out of position 12 and into position 16. When sequence switch 810 leaves position 11, the register relays are released.

As sequence switch 810 leaves position 11 it opens at the upper right and lower left hand contacts of spring 835 a circuit which up to this time maintains the energization of relays 706, 902 and 901 and these relays become deenergized. Relay 706 closes a circuit from battery through the winding of the magnet of sequence switch 710, right hand contacts of spring 716 (7+9), back contact and inner right hand armature of relay 706, lower contact of spring 718 (2+9) to ground. Sequence switch 710 moves into position 10 where it is ready to advance through its remaining positions to control the numerical registration in connection with a subsequent test. Sequence switch 810 is driven into position 18 where it awaits the next call, by means of the following circuit: battery through the magnet winding of said sequence switch, upper right hand contact of spring 834 (16), left hand contacts of spring 716 (10), front contact and outer right hand armature of relay 821 and lower left hand contact of spring 854 (8+16) to ground. On leaving position 17 sequence switch 810 opens the holding circuit of relay 821 and the counting relays 826, 827, 828, etc., whereby these relays all retract their armatures. The operator's key-board and all associated equipment are now restored to normal position ready to be taken for use in further tests.

*Restoration of the apparatus of the test set to normal.*

Upon completion of the office group test, sequence switch 920 is advanced to position 18 and the sequence switch 981 is advanced to position 1, as heretofore described. As sequence switch 920 passes through position 17½, a circuit for message register 999 is completed over a path from battery, winding of register 999, lower left hand contact of sequence switch spring 942 (17½+18) to ground.

With the message register 999 operated and the sequence switch 920 in position 18, a circuit is completed from battery, winding of sequence switch magnet 920, lower right hand contact of sequence switch spring 921 (18), contacts of sequence switch spring 998 (1), armature and contact of register 999, tips of jack 915 and plug 895, right hand contacts of sequence switch 849 (18+1), sleeves of plug 895 and jack 915, to ground, driving the sequence switch 920 from position 18 into position 1. Message register 999 then releases due to the opening of the contact at the sequence switch spring 942.

*Trouble or impulse failure.*

If impulses transmitted by the numerical control circuits have not been sent correctly; for example, if register lamp No. 1203 lights instead of register lamp No. 1202 during the thousands impulses, the relay 960 does not operate since its operating circuit is in parallel with the register lamp No. 1202. Consequently sequence switch 920 remains in position 3. With sequence switch 920 in position 3 relay 929 operates over a circuit from battery, winding of relay 929, back contact and armature of relay 928, conductor 933, left hand contacts of key 965, upper right hand contact of sequence switch spring 943 (3) to ground. Relay 929 in operating completes a circuit for relay 923 over a path including battery, winding of relay 923, front contact and armature of relay 929, and ground on the conductor 933. Relay 923 in operating completes a circuit for operating relay 928 over a path including battery, winding of relay 928, armature and front contact of relay 923, and ground on conductor 933. Relay 928 in operating completes a circuit for the energization of relay 927, said circuit including battery, winding of relay 927, back contact and armature of relay 926, front contact and armature of relay 928, and ground on conductor 933. Relay 928 in operating also opens the circuit for relay 929, whereupon said relay 929 releases. Relay 929 in retracting its armature opens the energizing circuit for relay 923, whereupon said relay 923 releases. Relay 923 in retracting its armature opens the energizing circuit for relay 928, whereupon said relay 928 releases. Relays 929 and 923 are of the slow to release type, and thus provide a sufficient interval for the complete operation of relays 926 and 928. Relay 928 in releasing removes the short circuit from the relay 926, whereupon said relay 926 operates and locks in series with relay 927 to ground on the conductor 933. After the release of relay 928, relay 929 again operates in turn, again operating relay 923. Relay 923 in operating again permits the operation of relay 928. Relay 928 in operating completes a circuit for the energization of relay 925 over a path from battery, winding of relay 925, back contact and armature of relay 924, front contact and armature of relay 926, and front contact and armature of relay 928, to ground on conductor 933. Relay 928 in operating also again releases relay 929, which in turn releases relay 923, which in turn releases relay 928. Relay 928 in releasing removes the short circuit from relay 924, causing said relay 924 to operate and lock in series with relay 925, to ground on conductor 933. Relay 929 again operates, as previously described, and completes a circuit for the energization of relay 923, which in operating in turn completes a circuit for the energization of relay 928. Relay 928 in operating locks through the front contact and armature of relay 924, the front contact and armature of relay 926, and the front contact and armature of relay 928, to ground on conductor 933. Relay 928 in operating releases relay 929, which in turn causes the release of relay 923. Relay 923 in retracting its armature places lamp 939 in parallel with the winding of relay 928, whereupon said lamp 939 lights as a trouble signal. After detecting the trouble the operator may advance sequence switch 920 out of position 3, thereby opening the circuit at the sequence switch spring 943 (3) for the relays 924, 927, 925, 926 and 928, to release said relays, thereby opening the circuit and causing the extinguishment of lamp 939. To advance switch 920, the operator depresses key 989 closing a circuit over the upper right hand contact of spring 987 (2+17) for relay 988 which upon energizing locks from ground at its left hand armature and contact over the upper left hand contact of spring 987 (3+17) and closes a circuit from ground at the lower left hand contact of spring 940 (2+17), the right hand contacts of relay 988 to battery through the winding of magnet 920. Sequence switch 920 restores the entire test circuit to normal.

Call to tandem.

When designations are recorded on the keyboards for the purpose of testing a call to a tandem point, the key 1191 of the test set is operated at the start of the test, and the operation of the various circuits and apparatus is similar to that previously described up until the time that the sequence switch 920 arrives in position 12 (district group selection). At this time relay 1192 is operated over a path including battery, winding of relay 1192, lower right hand contact of sequence switch spring 975 (12), lower left hand contact of sequence switch spring 975 (12), front contact and outer right hand armature of relay 902, contacts 904 to ground placed on conductor 795, through the operation of the district brush register relay 832 which may be energized on all tandem route calls.

Relay 1192, in operating, locks through its front contact and inner left hand armature, to ground on conductor 1130. Sequence switch magnet 920 is then operated over a path including ground, right hand armature and front contact of relay 960, right hand contacts of key 965, left hand alternate contacts of key 1191, front contact and outer left hand armature of relay 1192, upper right hand contact of sequence switch spring 964 (12), back contact and armature of relay 956, upper left hand contact of sequence switch spring 963 (12), lower right hand contact of sequence switch spring 963 (12), front contact and armature of relay 961 and winding of magnet 920, driving the sequence switch 920 from position 12 to position 13. Should the relay 1192 fail to operate in position 12 of the sequence switch 920, lamp 1180 will light over a circuit extending from battery, lamp 1180, right hand armature and back contact of relay 1192, right hand alternate contacts of key 1191, upper right hand contact of sequence switch spring 944 (12), to ground. Switch 920 will remain in position 12 since the circuit for advancing the switch to position 13 is open at the outer left hand contacts of the timing relay 1192. Under this condition the timing relays 923 to 929, inclusive, operate as heretofore described, lighting the lamp 939 as an indication of a failure in the circuit. If the relay 1192 operates on any call other than one to a tandem point, sequence switch 920 does not advance, the lamp 939 lights, and the timing relays 923 to 929, inclusive, operate as heretofore described, lighting the lamp 939.

Skip office calls.

If a test is made which does not require an office selector, the key 1194 is operated at the start of the test. The relay 1196 and the lamp 1181 function in position 13 (office group) of the sequence switch 920 in the same manner as relay 1192 and lamp 1180 function in position 12. In making a test of this character it is necessary to operate the office brush and office group keys in the test set, and the office brush and the office group relays in the translator and test circuits in the same manner as for a regular call in order to advance the test circuit sequence switch 920 from positions 11 and 13.

Test using exercise key.

When an exercise test is to be made, the exercise key 969 is operated before the number is recorded on the coordinate keys, and ground is connected to the contacts 914, through the upper right hand contact of sequence switch spring 942 (8½+7). The testing operation in a test of this character is the same as that heretofore described until after the stations test has been made when the testing device sequence switch 920 advances to position 8, in turn advancing the numerical control sequence switch 981 to position 6 which is the key to release position. When the test set sequence switch 920 advances out of position 7, ground for the release of the coordinate keys is disconnected, through the upper right hand contact of sequence switch spring 942 (8½+7), thereby preventing the keys from releasing. In position 8½ of the sequence switch spring 942, ground is again connected to the contacts 914 for continuing the test. In addition to this feature the exercise key, at the end of each test, causes the movement of the translator control circuit sequence switch into position 1 by a circuit including ground, lower right hand contact of sequence switch spring 942 (1), inner left hand contact of key 969, contacts 910, lower right hand contact of sequence switch spring 853 (18), winding of magnet 810 and battery and thus starts another test automatically. With the exercise key 969 operated, an additional circuit through the timing circuit for the lamp 939 is closed, said circuit including ground, upper left hand contact of sequence switch spring 943 (1), contacts 949 of key 969, and left hand contacts of key 965 to conductor 933. In case of failure, the timing relays may now operate as previously described and light the lamp 939. With key 969 operated, buzzer 938 is connected through the outer left hand contacts of key 969 in parallel with lamp 939 for the purpose of giving an audible signal.

Test using step-by-step key.

When a test employing the step-by-step key 965 is made, said key is operated before the designation of the test number is recorded on the coordinate keys. The step-by-step key makes it impossible for the switch to take more than one step with one operation of the start key by opening the circuit from battery, through the sequence switch magnet 920. At the same time, the timing circuit for the lamp signal 939 is opened through the left hand contacts of the key, thus preventing the alarm circuit from functioning while the switch remains in any position longer than usual. To advance the testing device and the locking sequence switch from one position to another, the non-locking start key 968 is operated, thereby operating relay 967 over a path from battery, winding of relay 967, right hand contact, alternate contacts of key 968, and front contact and inner left hand armature of relay 960 to ground. Relay 967 then locks through its right hand contacts to ground at the inner left hand contact of relay 960. The sequence switch magnet 920 then operates over a path including battery, winding of magnet 920, through the normal or alternate contacts of relay 961, as the case may be, contacts of sequence switch spring 963, normal or alternate contacts of relay 956 as the case may be, contact of sequence switch spring 964, left hand contacts of relay 967, right hand normal contacts of key 968 as soon as this key is released, and front contact and right hand armature of relay 960 to ground. From the description previously given it will be noted that as impulses are transmitted to the registers of the testing device either one or the other of the relays 961 or 956 are operated and certain contacts of the springs 963 and 964 are closed so that a circuit for magnet 920 is afforded. As the sequence switch advances, relay 960 releases, as previously described, causing in turn the release of the start relay 967.

What is claimed is:

1. In a telephone exchange system employing a plurality of primary registers, a plurality of secondary registers and a translator controlled by said primary registers for successively operating said secondary registers, a testing device, and means in said testing device to cause said translator to perform its regular service functions and to test the accuracy of operation of said translator.

2. In a telephone exchange system employing a plurality of keys operable in variable combinations, a plurality of relay registers and a multi-position switch controlled by said keys for successively operating said relay registers, a testing device, and means in said testing device to cause said switch to perform its regular service functions and to test the accuracy of operation of said switch.

3. In a telephone exchange system employing an impulse controlling device, an impulse sending means and means to operate said controlling device to control the impulses sent by said sending means in successive sets of impulses, a testing device, a key, and means controlled by said key for operating said testing device to test step by step the successive sets of impulses.

4. In a telephone exchange system employing a plurality of variably operable primary registers, means to selectively position said primary registers, a progressively operable switch, means to position said switch under the joint control of said registers, a plurality of secondary registers and means for setting said secondary registers in accordance with the position assumed by said switch, a testing device, and means to operate said testing device step by step to test the accuracy of the setting of said secondary registers.

5. In a telephone exchange system employing a sending device arranged to control the sending of a plurality of sets of impulses, a testing device, means to test the correctness of the successive sets of impulses, and means for repeatedly operating the testing device to test the correctness of the successive sets of impulses.

6. In a telephone exchange system employing a sending device arranged to control the sending of a plurality of sets of impulses, a testing device, means to test the correctness of the successive sets of impulses, a key, and means controlled by a single actuation of said key for repeatedly operating the testing device to test the correctness of the successive sets of impulses.

7. In combination, a keyboard, means controlled by said keyboard to transmit a plurality of sets of impulses, a testing device, means to operate said testing device to test the correctness of the successive sets of impulses, and means operable for causing the repeated transmission of the impulses and the repeated operation of the testing device with a single actuation of the keyboard.

8. In a testing system, a keyboard, a plurality of registers, a multi-position switch controlled by said keyboard for setting said registers, a second plurality of registers, means for setting said second registers in accordance with the setting of said first named registers, a set of register signals, and means for actuating said signals to indicate the accuracy of the setting of said second registers.

9. In a testing system, a plurality of keys operable in variable combinations, a multi-position switch controlled by said keys, a set of registers controlled by said switch, a second set of registers arranged to be operated in accordance with the setting of said first named registers, a second set of keys, a set of indicating devices, and circuits controlled by said second set of keys for actuating said devices to determine whether said second registers have been operated in accordance with the designation recorded by said first named actuated keys.

10. In a testing system, a plurality of keys operable in variable combinations, means associated therewith for transmitting codes of impulses determined by the particular keys operated, a plurality of registers successively operated by said codes of impulses, a set of register signals, and means for actuating said signals to indicate the accuracy of the setting of said registers.

11. In a telephone exchange system in which connections are established under the control of an office sending device, an operator's keyboard, registers, means for setting said registers in accordance with the office portion of a designation recorded upon said keyboard, a testing device comprising a second plurality of registers, means for transferring the registration from said first registers to the registers of said test device, and means at said testing device responsive to give a signal if said first named registers fail to register a designation of a particular type recorded upon said keyboard.

12. In a telephone exchange system in which connections are established under the control of an office sending device, an operator's keyboard comprising a plurality of office keys, registers, means under the control of said keys for operating said registers, a testing device comprising a second plurality of registers, means for transferring the registration from said first registers to the registers of said testing device, a key at said test device operatable when certain of said office keys are operated denoting office designations of a specified class, and means under the control of said key for indicating the failure of said first named registers to correctly register said certain office designations.

In witness whereof, I hereunto subscribe my name this 20th day of October A. D., 1922.

ARNOLD S. BERTELS.